(12) United States Patent  
Keith

(10) Patent No.: US 10,914,392 B2
(45) Date of Patent: Feb. 9, 2021

(54) SELF-OBSTRUCTING FLAMMABLE FLUID CARRYING CONDUIT

(71) Applicant: Thomas R. Crane, Plymouth, MN (US)

(72) Inventor: Charles G. Keith, Plymouth, MN (US)

(73) Assignee: Thomas R. Crane, Plymouth, MN (US)

(*) Notice: Subject to any disclaimer, the term of this patent is extended or adjusted under 35 U.S.C. 154(b) by 0 days.

(21) Appl. No.: 16/153,979

(22) Filed: Oct. 8, 2018

(65) Prior Publication Data

US 2019/0309868 A1    Oct. 10, 2019

Related U.S. Application Data

(63) Continuation of application No. 15/294,885, filed on Oct. 17, 2016, now Pat. No. 10,094,484, which is a continuation of application No. 14/185,517, filed on Feb. 20, 2014, now Pat. No. 9,470,327.

(60) Provisional application No. 61/767,069, filed on Feb. 20, 2013.

(51) Int. Cl.

| F16K 17/38 | (2006.01) |
| F16K 31/00 | (2006.01) |
| F16L 55/10 | (2006.01) |
| A62C 2/06 | (2006.01) |

(52) U.S. Cl.
CPC .............. *F16K 17/38* (2013.01); *A62C 2/065* (2013.01); *F16K 31/002* (2013.01); *F16L 55/1026* (2013.01); *Y10T 137/1963* (2015.04)

(58) Field of Classification Search
CPC .... F16K 17/38; F16K 31/002; F16L 55/1026; A62C 2/065; Y10T 137/0391; Y10T 137/1812; Y10T 137/1963

USPC ................. 137/13, 74, 79; 236/12.18, 101 R
See application file for complete search history.

(56) References Cited

U.S. PATENT DOCUMENTS

| 288,271 A | 11/1883 | Stearns |
| 1,848,031 A | 3/1932 | Spencer |
| 2,097,585 A | 11/1937 | Carson |
| 2,850,257 A | 9/1958 | Smith et al. |
| 3,156,263 A | 11/1964 | Adelman |
| 3,317,135 A | 5/1967 | Maurice |
| 3,320,087 A | 5/1967 | Erickson |
| 3,322,345 A | 5/1967 | Getz |
| 3,540,479 A | 11/1970 | Thompson |
| 3,725,095 A | 4/1973 | Weidman et al. |

(Continued)

FOREIGN PATENT DOCUMENTS

| EP | 0717228 | 6/1996 |
| EP | 0914840 | 5/1999 |

(Continued)

OTHER PUBLICATIONS

International Preliminary Report on Patentability for PCT Application No. PCT/US2017/033024 dated Nov. 29, 2018 (9 pages).

(Continued)

*Primary Examiner* — Minh Q Le
(74) *Attorney, Agent, or Firm* — Pauly, DeVries Smith & Deffner LLC

(57) ABSTRACT

The present invention is directed to improved assembly for transporting flammable fluids. In an example, the assembly comprises a conduit, a liner, and a core. The liner comprises a material that contracts in response to an elevation in temperature. In an example, the liner comprises a material that expands in response to an elevation in temperature.

17 Claims, 27 Drawing Sheets

(56) References Cited

U.S. PATENT DOCUMENTS

| | | |
|---|---|---|
| 3,904,111 A | 9/1975 | Petersson et al. |
| 4,046,406 A | 9/1977 | Press et al. |
| 4,072,159 A | 2/1978 | Kurosawa |
| 4,136,707 A | 1/1979 | Kirch et al. |
| 4,143,670 A | 3/1979 | Olson et al. |
| 4,143,671 A | 3/1979 | Olson |
| 4,229,341 A | 10/1980 | Yamaguchi et al. |
| 4,253,603 A | 3/1981 | Johnson |
| 4,267,853 A | 5/1981 | Yamaguchi et al. |
| 4,424,867 A | 1/1984 | Mallow et al. |
| 4,492,095 A | 1/1985 | Brister et al. |
| 4,512,155 A | 4/1985 | Sheinbaum |
| 4,513,173 A | 4/1985 | Merry et al. |
| 4,539,262 A | 9/1985 | Hurst et al. |
| 4,549,717 A | 10/1985 | Dewaegheneire |
| 4,559,745 A | 12/1985 | Wexler |
| 4,649,949 A | 3/1987 | Scobie et al. |
| 4,796,401 A | 1/1989 | Wexler |
| 4,942,903 A | 7/1990 | Jacobsen |
| 4,972,880 A | 11/1990 | Strand |
| 5,174,077 A | 12/1992 | Murota |
| 5,301,475 A | 4/1994 | Stefely et al. |
| 5,347,767 A | 9/1994 | Roth |
| 5,351,448 A | 10/1994 | Gohlke et al. |
| 5,365,963 A | 11/1994 | Hoffmann |
| 5,421,127 A | 6/1995 | Stefely |
| 5,443,851 A | 8/1995 | Christie et al. |
| 5,456,050 A | 10/1995 | Ward et al. |
| 5,546,757 A | 8/1996 | Whipple et al. |
| 5,634,304 A | 6/1997 | Sakno |
| 5,713,524 A | 2/1998 | Greene et al. |
| 5,842,524 A | 12/1998 | Farmer |
| 5,913,326 A | 6/1999 | Lembser |
| 5,927,312 A | 7/1999 | Dryden et al. |
| 5,984,257 A | 11/1999 | Baek et al. |
| 5,985,385 A | 11/1999 | Gottfried |
| 6,102,897 A | 8/2000 | Lang |
| 6,158,711 A | 12/2000 | Woo |
| 6,199,573 B1 | 3/2001 | Paskiewicz |
| 6,228,312 B1 | 5/2001 | Boyce |
| 6,405,502 B1 | 6/2002 | Cornwall et al. |
| 6,409,147 B1 | 6/2002 | Kenny |
| 6,477,813 B2 | 11/2002 | Andresen |
| 6,550,495 B1 | 4/2003 | Schulze |
| 6,607,004 B2 | 8/2003 | Kleiner et al. |
| 6,615,860 B2 | 9/2003 | Didone et al. |
| 6,746,761 B2 | 6/2004 | Janoff et al. |
| 6,862,852 B1 | 3/2005 | Beele et al. |
| 6,933,028 B2 | 8/2005 | Milhas |
| 6,988,364 B1 | 1/2006 | Lamb et al. |
| 7,066,207 B2 | 6/2006 | Miller et al. |
| 7,104,517 B1 | 9/2006 | Derand et al. |
| 7,407,113 B2 | 8/2008 | Guterman |
| 7,640,950 B2 | 1/2010 | Tan |
| 7,784,221 B2 | 8/2010 | Truss |
| 7,998,433 B2 | 8/2011 | Park et al. |
| 8,183,315 B2 | 5/2012 | Männle et al. |
| 8,613,396 B1 | 12/2013 | Anderson |
| 8,794,254 B2 | 8/2014 | Maier et al. |
| 8,795,802 B2 | 8/2014 | Onodera |
| 8,833,478 B2 | 9/2014 | Zernach et al. |
| 8,962,115 B2 | 2/2015 | Okabe et al. |
| 9,212,754 B2 | 12/2015 | Jackson, Jr. |
| 9,470,327 B2 | 10/2016 | Keith |
| 10,094,484 B2 | 10/2018 | Keith |
| 2001/0017163 A1 | 8/2001 | Penza |
| 2003/0010948 A1 | 1/2003 | Horiuchi et al. |
| 2006/0243934 A1 | 11/2006 | Chung et al. |
| 2008/0174110 A1 | 7/2008 | Olson |
| 2009/0189102 A1 | 7/2009 | Linden |
| 2011/0088792 A1 | 4/2011 | Ito et al. |
| 2012/0135202 A1 | 5/2012 | Weidinger et al. |
| 2012/0161042 A1 | 6/2012 | Sheppard et al. |
| 2013/0025724 A1 | 1/2013 | Grebinoski et al. |
| 2013/0126184 A1 | 5/2013 | Gerrard et al. |
| 2013/0192833 A1 | 8/2013 | Gano et al. |
| 2014/0113981 A1 | 4/2014 | Yilmaz et al. |
| 2014/0163693 A1 | 6/2014 | Mcknight et al. |
| 2014/0209822 A1 | 7/2014 | Mathiesen et al. |
| 2014/0216733 A1 | 8/2014 | Mathiesen et al. |
| 2014/0230918 A1 | 8/2014 | Keith |
| 2015/0316161 A1 | 11/2015 | Buckingham |
| 2016/0169399 A1 | 6/2016 | Querejeta Andueza |
| 2017/0130852 A1 | 5/2017 | Keith |
| 2018/0306338 A1 | 10/2018 | Benetti et al. |
| 2019/0277420 A1 | 9/2019 | Keith |

FOREIGN PATENT DOCUMENTS

| | | |
|---|---|---|
| EP | 2413110 | 2/2012 |
| EP | 2487470 | 8/2012 |
| EP | 2520837 | 11/2012 |
| WO | 0069616 | 11/2000 |
| WO | 2006097290 | 9/2006 |
| WO | 2014130683 | 8/2014 |
| WO | 2017201122 | 11/2017 |

OTHER PUBLICATIONS

International Search Report and Written Opinion for PCT Application No. PCT/US2017/033024 dated Aug. 10, 2017 (12 pages).

"File History," for U.S. Appl. No. 14/185,517 downloaded Dec. 28, 2018 (181 pages).

"File History" for U.S. Appl. No. 15/294,885 downloaded Dec. 28, 2018 (387 pages).

"International Preliminary Report on Patentability," for PCT/US2014/017414 dated Sep. 3, 2015 (8 pages).

"International Search Report and Written Opinion," for PCT/US2014/017414, dated Jun. 11, 2014 (12 pages).

Non-Final Office Action for U.S. Appl. No. 16/302,376 dated Dec. 11, 2019 (29 pages).

Office Action for Canadian Patent Application No. 2,902,027 dated Feb. 28, 2020 (4 pages).

Response to Non-Final Rejection dated Dec. 11, 2019 for U.S. Appl. No. 16/302,376, submitted via EFS-Web dated Jun. 10, 2020, 9 pages.

Final Office Action for U.S. Appl, No. 16/302,376 dated Sep. 10, 2020 (26 pages).

Response to Examiner's Report for Canadian Patent Application No. 2,902,027 filed Aug. 28, 2020 (14 pages).

SELF-OBSTRUCTING FLAMMABLE FLUID CARRYING CONDUIT

CLAIM OF PRIORITY

This application is a Continuation of U.S. application Ser. No. 15/294,885, filed Oct. 17, 2016, which is a Continuation of U.S. application Ser. No. 14/185,517, filed Feb. 20, 2014, now U.S. Pat. No. 9,470,327, issued on Oct. 18, 2016, which claims the benefit of U.S. Provisional Application No. 61/767,069, filed Feb. 20, 2013, the contents of which are herein incorporated by reference in their entirety.

FIELD OF THE INVENTION

The present invention relates to conduit for flammable fluids. More specifically, the present invention relates to a conduit for flammable fluids designed to stop or limit flow of fluids in response to elevated temperature.

BACKGROUND OF THE INVENTION

Flammable fluids (such as methane gas or liquid gasoline) are used in both residential and industrial applications. Flammable fluids frequently enter or are stored in a system in one area, but are needed in a different area. Flammable fluids are therefore transported through the conduit, frequently piping, from the place the fluid enters the system to the place they are needed. If the conduit in which the flammable fluids are contained is exposed to a fire or increased temperatures, a dangerous situation exists because the conduit can become compromised, thereby allowing the flammable fluids to escape. For example, if the conduit is metal, and subject to a lightning strike, the conduit can become compromised, resulting a fire and explosion hazard Therefore, a need exists for a way to shut off or limit the flow of flammable fluids in the event of an elevated temperature, such as caused by a fire or lightning strike.

SUMMARY OF THE INVENTION

The present invention is directed to an assembly for restricting fluid flow in response to elevated temperatures. The assembly comprises a conduit that can be configured to transport flammable fluids. The assembly can also comprise a liner located on an internal surface of the conduit. The liner can comprise a material that contracts in response to elevated temperatures. The liner can be configured to encircle a portion of the conduit. The assembly can also comprise a core within the conduit. When the assembly is exposed to an elevated temperature, the liner within the conduit can contract around the core such that flow of flammable gas through the conduit is substantially prevented.

In an embodiment, the assembly can include a liner that can be configured to expand in response to an increase in temperature, such as fire. When the liner is expanded, the liner can occupy the majority of the aperture along a cross-section, such that the flow of fluid is substantially terminated.

In an embodiment, the assembly can include a core. The core can be configured to expand in response to an increase in temperature, such as fire. When the core is expanded, the core can occupy the majority of the aperture along a cross-section, such that the flow of fluid is substantially terminated.

The above summary of the present invention is not intended to describe each discussed embodiment of the present invention. This is the purpose of the figures and the detailed description that follows.

FIGURES

The invention may be more completely understood in contestation of the following detailed description of various embodiments of the invention in connection with the accompanying drawings in which.

DETAILED DESCRIPTION

Figure 1:
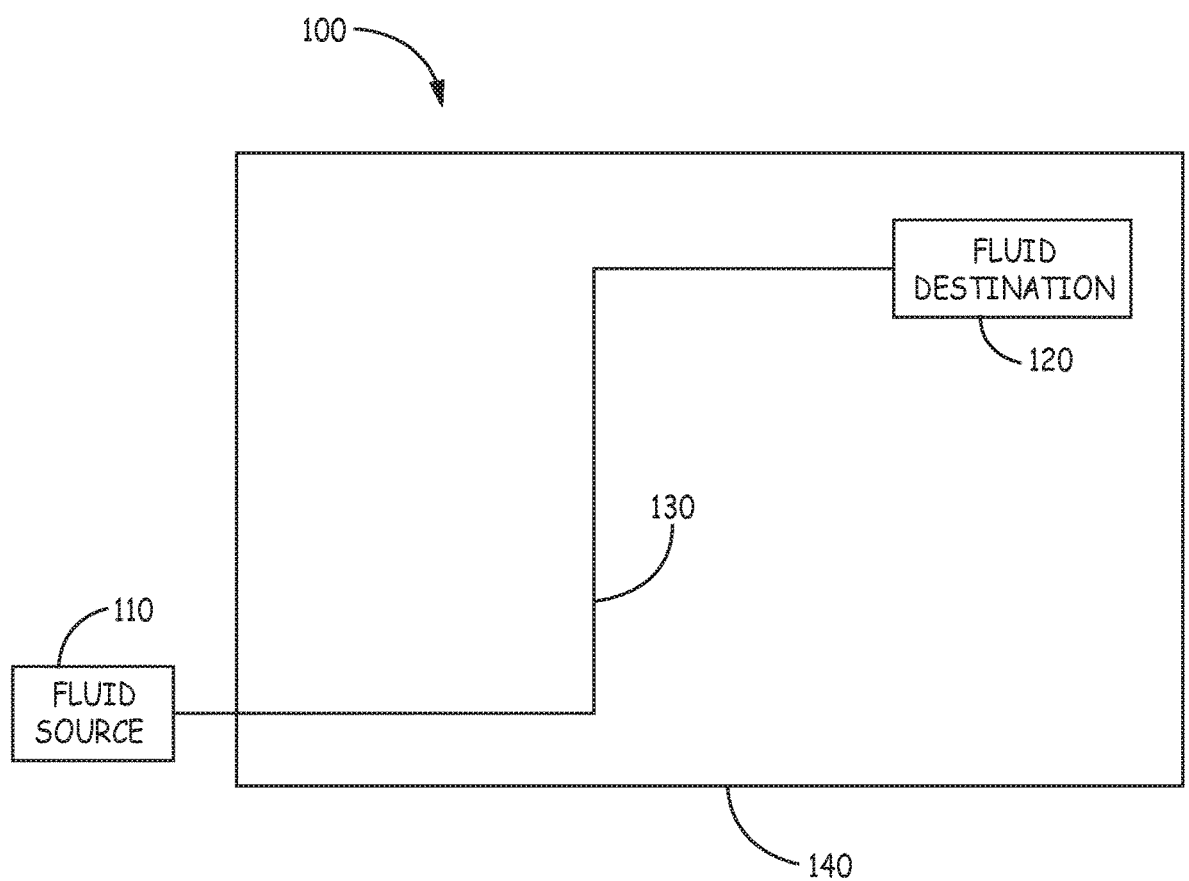
FIG. 1 is a simplified schematic of a system for fluid delivery.

Now, in reference to the drawings, FIG. 1A shows a schematic of a system 100 comprising a fluid source 110, a fluid destination 120, a conduit 130, and a wall 140 of a structure (such as a house). The wall 140 can represent the wall numerous environments such as a house, business, a combustion engine or any other structure or component that may use or contain flammable fluid. The system 100 can comprise a fluid source 110, such as where fluid is produced, stored, or introduced into the system. Fluid can travel from the fluid source 110 through conduit 130, such to transport the fluid from the fluid source 110 to the fluid destination 120. In an embodiment, the fluid source 110 can be within the wall 140.

The fluid traveling from the fluid source 110 to the fluid destination 120 through conduit 130 can include a gas, a liquid, or a combination of gas and liquid. In an embodiment, the fluid can be flammable. For example, the fluid can include a flammable gas such as natural gas (methane), propane, butane, or hydrogen. The fluid can include a liquid, such as gasoline, diesel fuel, lubricants, or hydraulic fluids (brake fluid, steering fluid, transmission fluid, etc. . . . ). It is understood that there are additional flammable gases and liquids that could travel through the conduit 130. The conduit 130 can include corrugated stainless steel tubing ("CSST"). The conduit 130 can also include external gas risers, piping, or appliance connectors. An appliance connectors can couple piping to an appliance.

The system 100 can include one or more walls 140, such as to enclose a space or define the boundary of the system. In some situations the walls 140 or other components of the system can catch on fire exposing the conduit 130 to flames and an increase in temperature.

Figure 2:
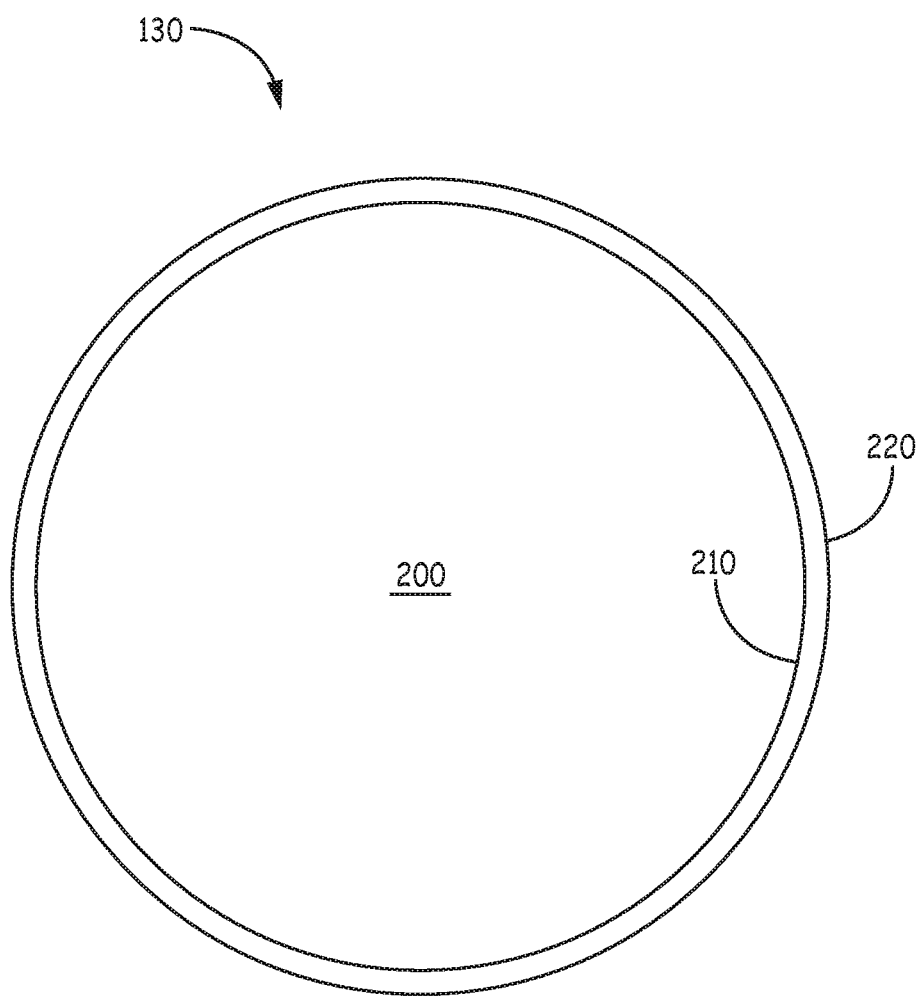
FIG. 2 is an end cross-sectional view of conduit.
Figure 3:
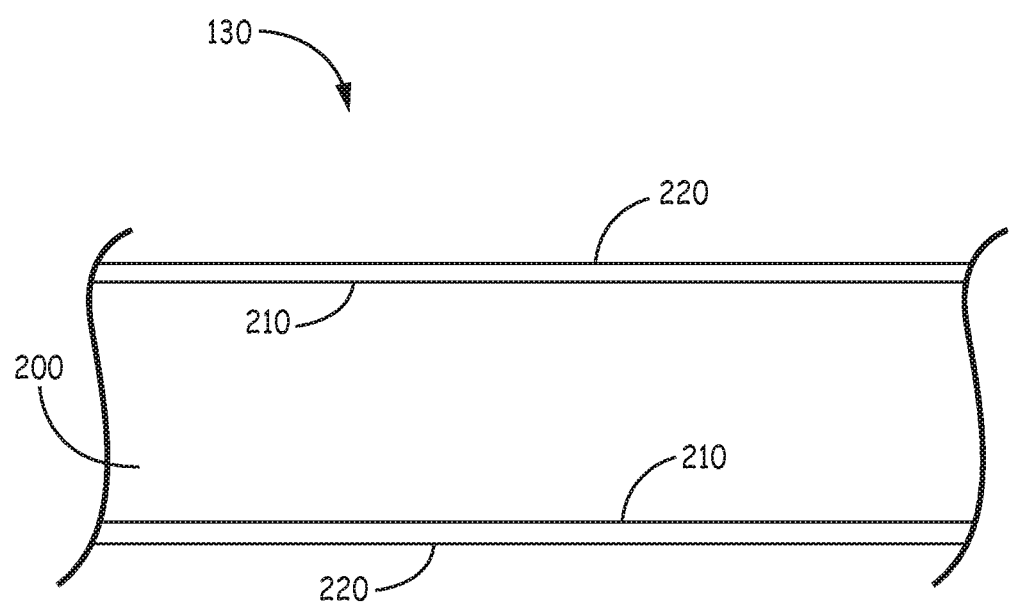
FIG. 3 is a side cross-sectional view of conduit shown in FIG. 1.

FIG. 2 shows a cross-section view of the conduit 130 from an end. FIG. 3 shows a cross-section view of the conduit 130 from a side. Conduit 130 can comprise different cross-sections and different materials. In some embodiments the cross-section of the conduit 130 is circular, such as shown in FIG. 2. The conduit can comprise an inner wall 210 and an outer wall 220. The conduit 130 can comprise an aperture 200, such as to allow fluid to pass through the conduit 130. The fluid can pass through the conduit 130, such as when the fluid is traveling from the fluid source 110 to the fluid destination 120.

Figure 4:
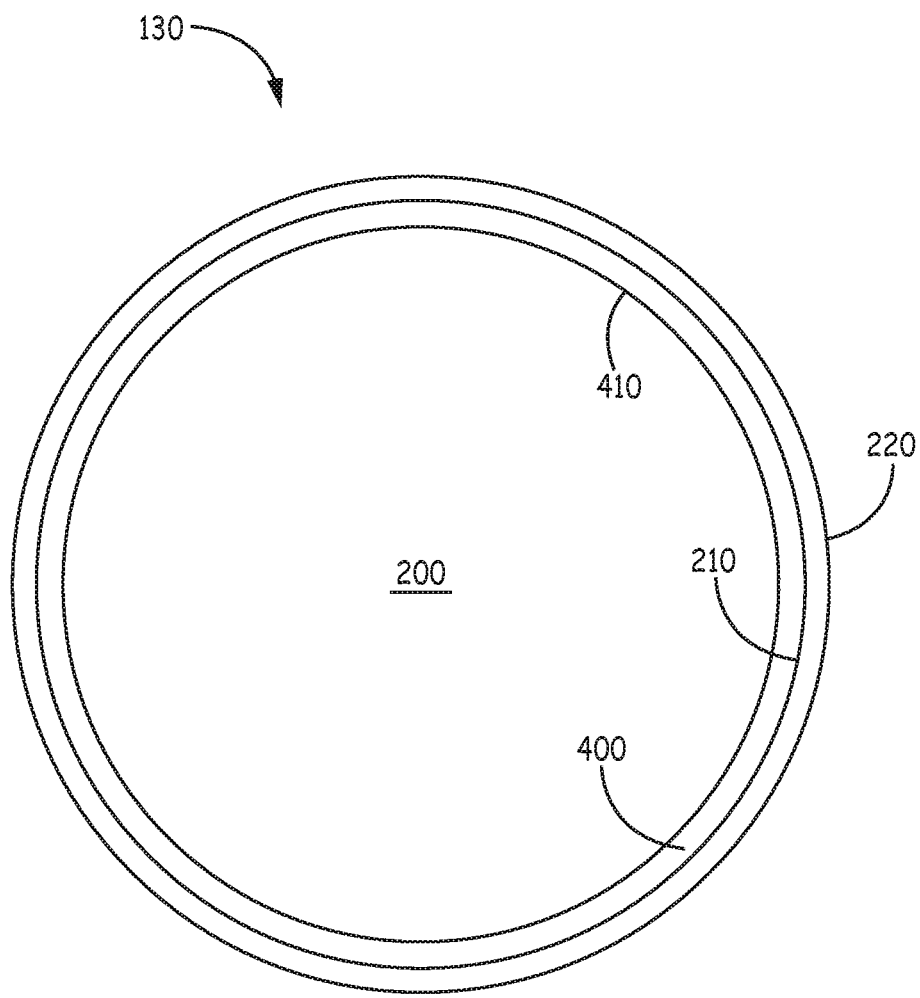
FIG. 4 is an end cross-sectional view of conduit with a liner in accordance with an implementation of the invention.

FIG. 4 shows a cross-section view of conduit with a liner 400. The liner 400 can be disposed on at least a portion of the inside wall 210 of the conduit 130. The liner 400 can encircle at least a portion of the aperture 200. The inner surface 410 of the liner 400 can at least partially define the aperture 200.

The liner 400 can comprise a heat sensitive polymer or a thermoplastic. A thermoplastic can become pliable or moldable above a specific temperature and then return to a solid state once it has cooled. The liner 400 can comprise, for example, a polyolefin.

In an embodiment, if the conduit 130 or a portion of the conduit 130 is exposed to an increase in temperature, such as if there is a fire, the liner 400 can shrink or constrict and at least partially close the aperture 200, thereby at least partially restricting the flow of fluid through the conduit 130.

In an additional embodiment, if the conduit 130 or a portion of the conduit 130 is exposed to an increase in temperature, such as if there is a fire, the liner 400 can constrict and completely close the aperture 200 along a portion of the conduit 130. When the liner 400 constricts and closes the aperture 200, the flow of fluid through the conduit 130 can be stopped or reduced.

Figure 5:
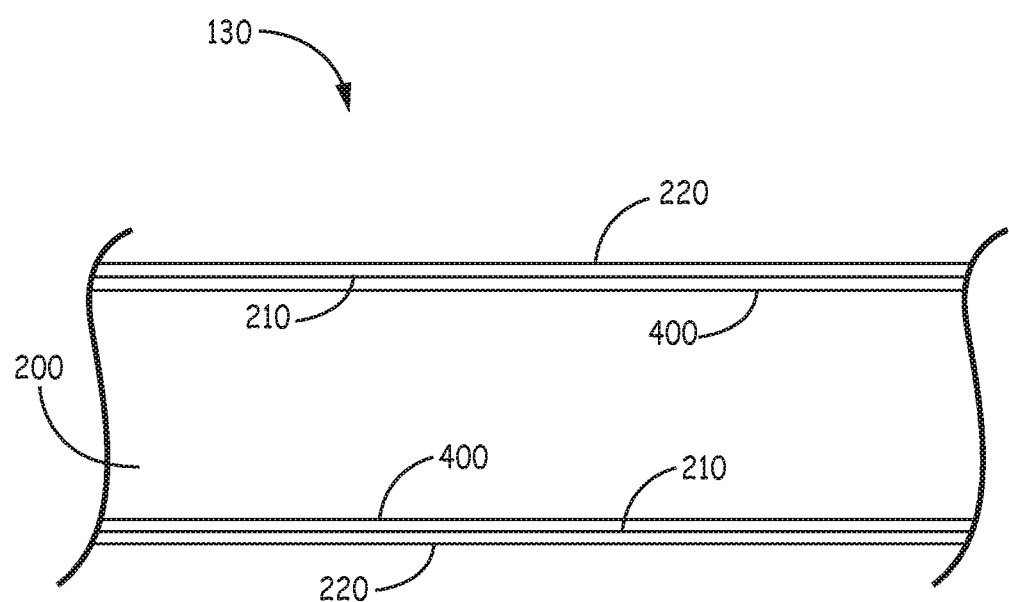
FIG. 5 is a side cross-sectional view of conduit with a liner shown in FIG. 4.

FIG. 5 shows a side view of a cross section of the conduit 130 with a liner 400. The liner 400 can be disposed on the inner wall 210 of the conduit 130. The liner 400 can substantially cover the inner wall 210 of the conduit 130.

Figure 6:
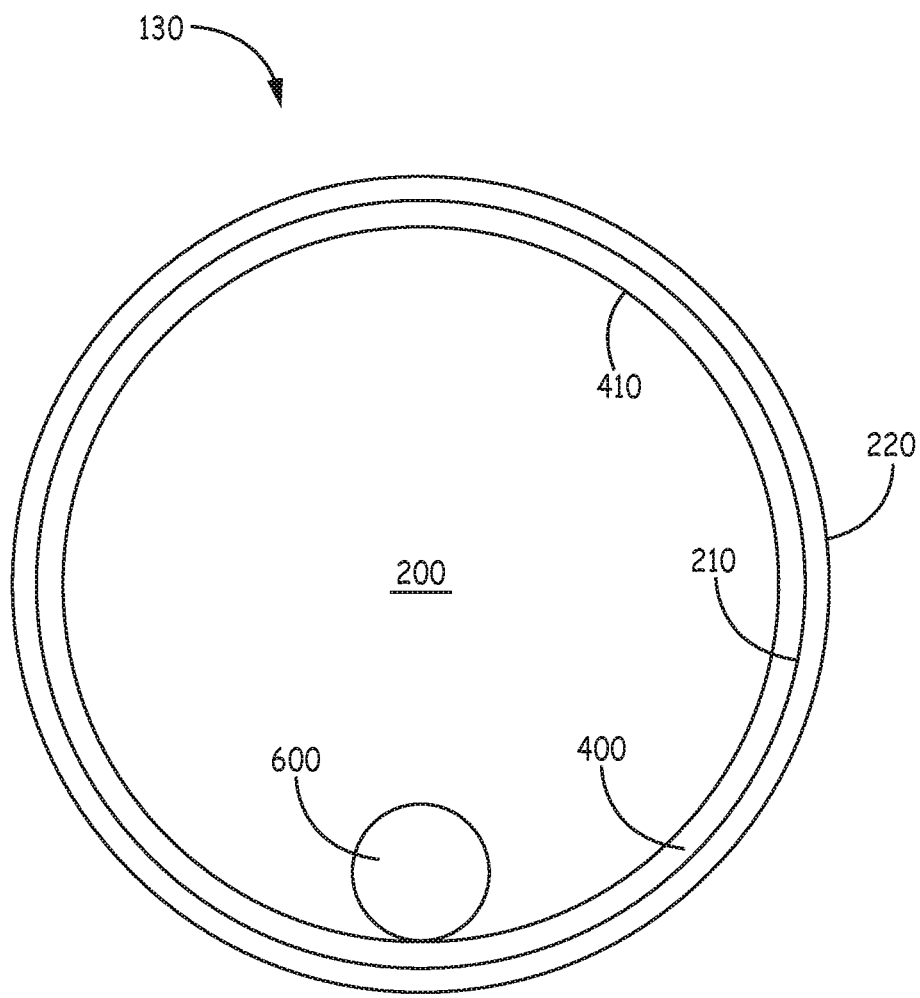
FIG. 6 is an end cross-sectional view of conduit with a liner and a core.

In reference now to FIG. 6, a cross-section view of the conduit 130 with a liner 400 and a core 600 is shown. In various embodiments, a core 600 is disposed within the aperture 200. The core 600 can be disposed on an inner surface 410 of the liner 400. The cross section of the core 600 can have a similar shape as the aperture 200, the inner wall 210, or the inner surface 410. The shapes can be similar, in that they have the same shape, but are of different sizes. The core 600 can comprise a material that substantially maintains its shape when exposed to an increase in temperature. The core 600 can comprise the same material as the conduit 130, the liner 400, or a different material.

In an embodiment, if the conduit 130 or a portion of the conduit 130 is exposed to an increase in temperature, such as if there is a fire, the liner 400 can separate itself from the inner wall of the conduit 210 as it contracts around the core 600. When the liner 400 contracts around the core 600, the liner 400 and the core 600 can at least partially block the flow of fluid through the aperture 200 (shown in FIG. 13). The core 600 can assist the liner 400 in blocking the flow of fluid through the conduit 130 when the contracted liner 400 alone does not provide sufficient blockage of the aperture 200, such as in high pressure environments or when the thermoplastic material does not contract in the proper manner to cover the aperture 200.

Figure 7:
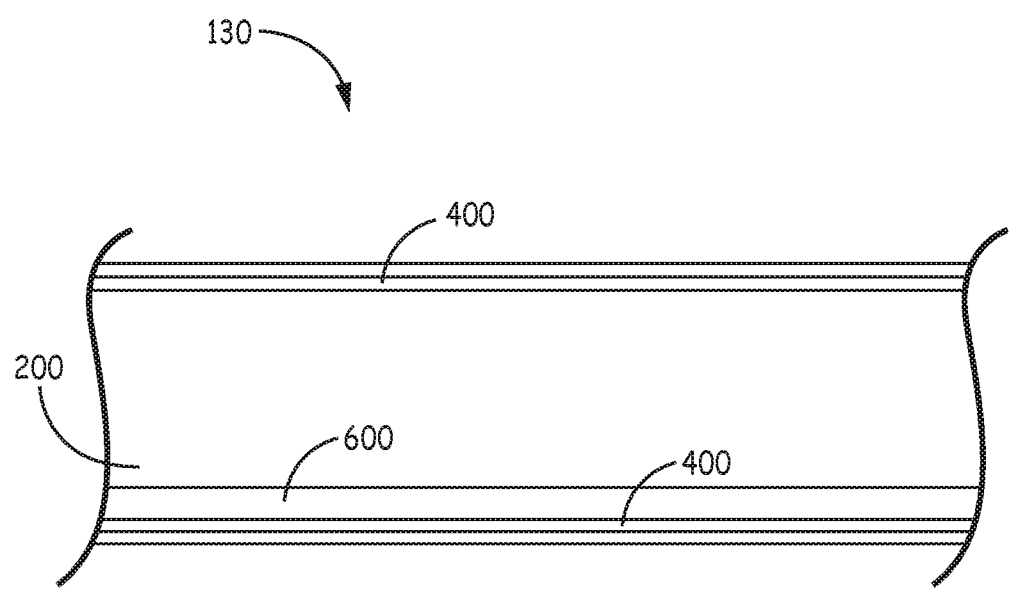
FIG. 7 is a side cross-sectional view of conduit with a liner and a core shown in FIG. 6.

Referring now to FIG. 7, the core 600 can continuously extend along the conduit 130. The core 600 can have a substantially similar length as the conduit 130 or the aperture 200.

Figure 8:
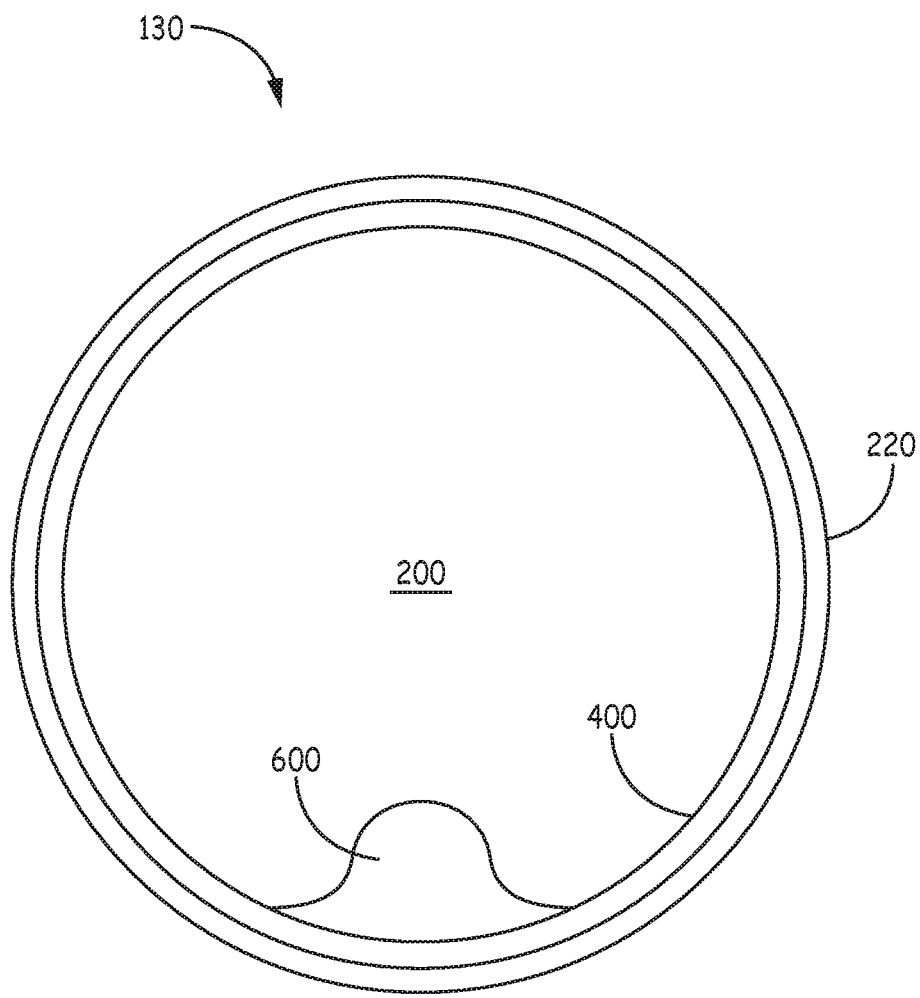
FIG. 8 is an end cross-sectional view of conduit with a core integrally formed with the liner.

FIG. 8 shows a cross-section view of conduit 130 with the core 600 integrally formed with the liner 400. In an embodiment, the core 600 can be integrally formed with the liner 400, such as if the core 600 and the liner 400 are extruded together. The core can be coupled to the liner, such as when the core 600 and the liner 400 comprise different materials or the core 600 is disposed within the aperture 200 after the liner 400 has been disposed within the conduit 130. The core 600 can be coupled to the liner 400, such as by welding, gluing, or fusing. Other options for coupling the core 600 to the liner 400 are available. The core 600 and the liner 400 can comprise the same material or different materials.

Figure 9:
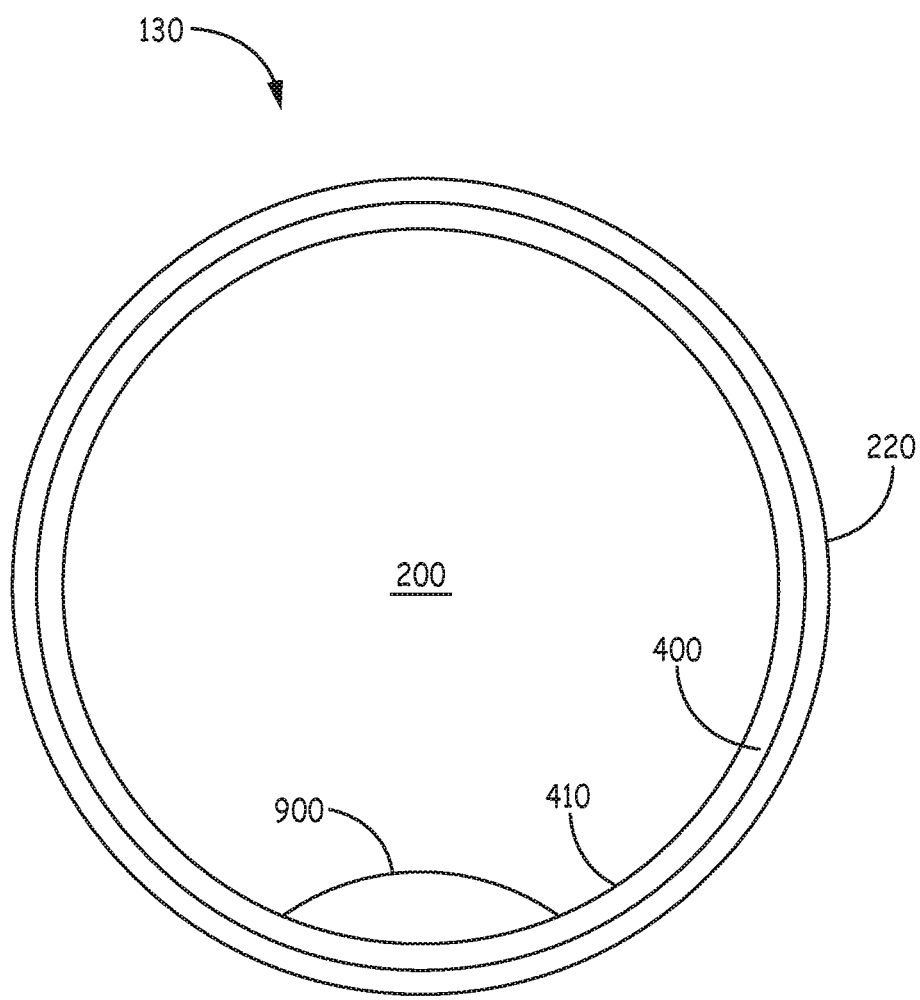
FIG. 9 is an end cross-sectional view of conduit with a liner and a foam insert.

FIG. 9 shows a cross-section view of the conduit 130 with a liner 400 and a foam insert 900. A foam insert 900 can be disposed within the aperture 200. A foam insert 900 can be disposed on the inner surface 410 of the liner 400. The foam insert 900 can comprise a foam that reacts to an increase in temperature, such as a foam that expands or changes shapes. In some instances the foam insert 900 can take a cylindrical shape, similar to the core 600 shown previously in FIG. 6. A foam insert 900 can block less of the aperture 200 in its original state than a standard core 600, such as when the foam insert 900 expands when it is heated. A foam insert 900 can also take a different shape when it is heated, such as if a certain shape of the aperture 200 is desired during standard operation, but the shape is not desirable when restricting or stopping the flow of gas in an increased temperature environment.

Figure 10:
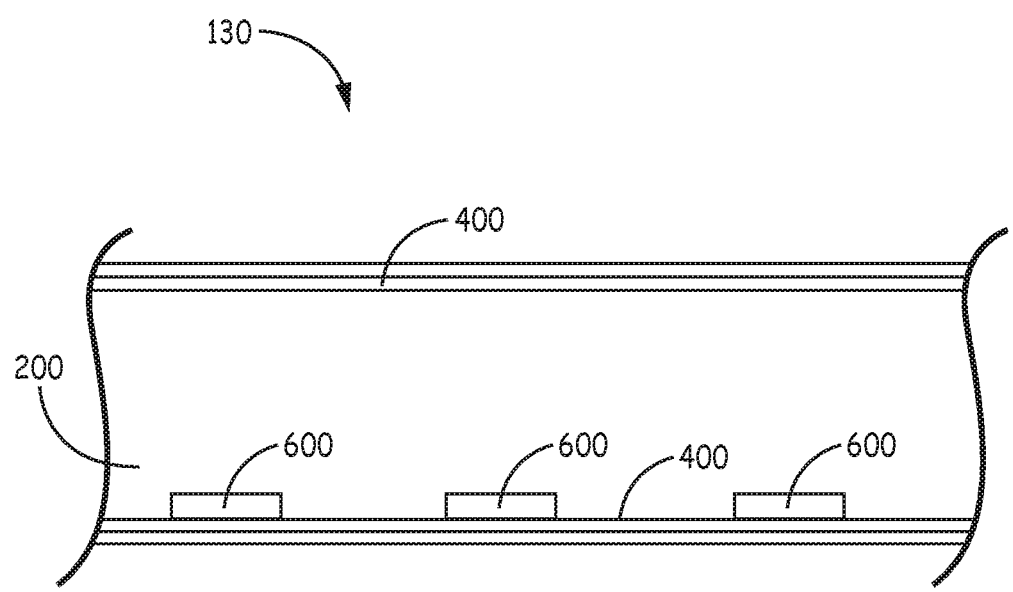
FIG. 10 is a side cross-sectional view of conduit with a liner and a non-continuous core.

The conduit 130 can include one or more segments of a core 600, as shown in FIG. 10. A segmented core 600 can be continuous, such as when segments are linked to one another. A segmented core 600 can be non-continuous, such as shown in FIG. 10 or when the core 600 comprises a plurality of beads.

Figure 11:
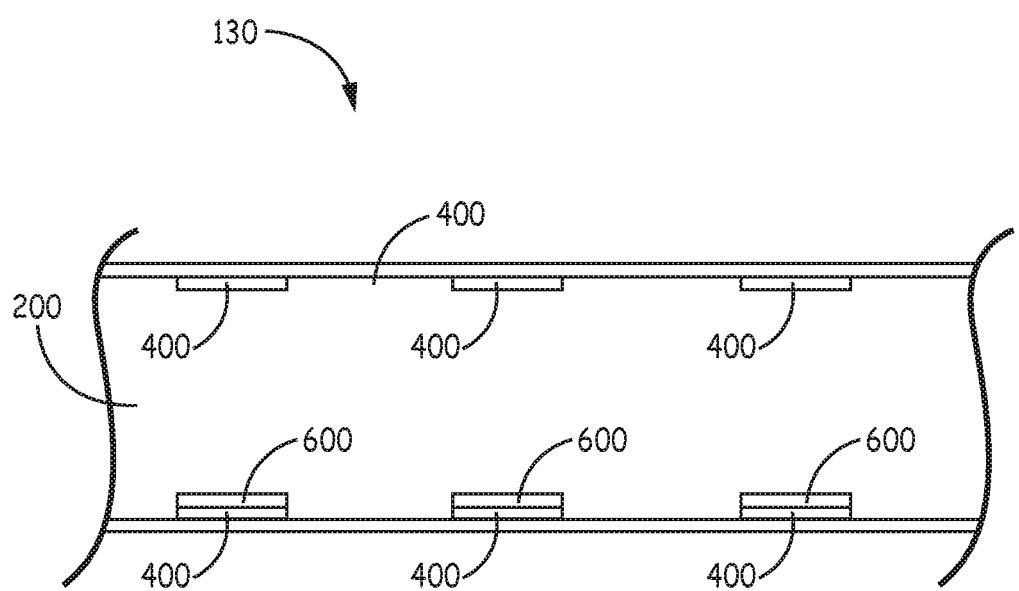
FIG. 11 is a side cross-sectional view of conduit with a non-continuous liner and a non-continuous core.

Similar to the non-continuous core 600 segments shown in FIG. 10, the liner 400 can also be segmented and the liner 400 can be continuous or non-continuous. In FIG. 11, an embodiment is shown with a non-continuous segmented liner 400. An embodiment with a non-continuous liner 400 can have a continuous core 600 or a non-continuous core 600 (as shown in FIG. 11).

Figure 12:
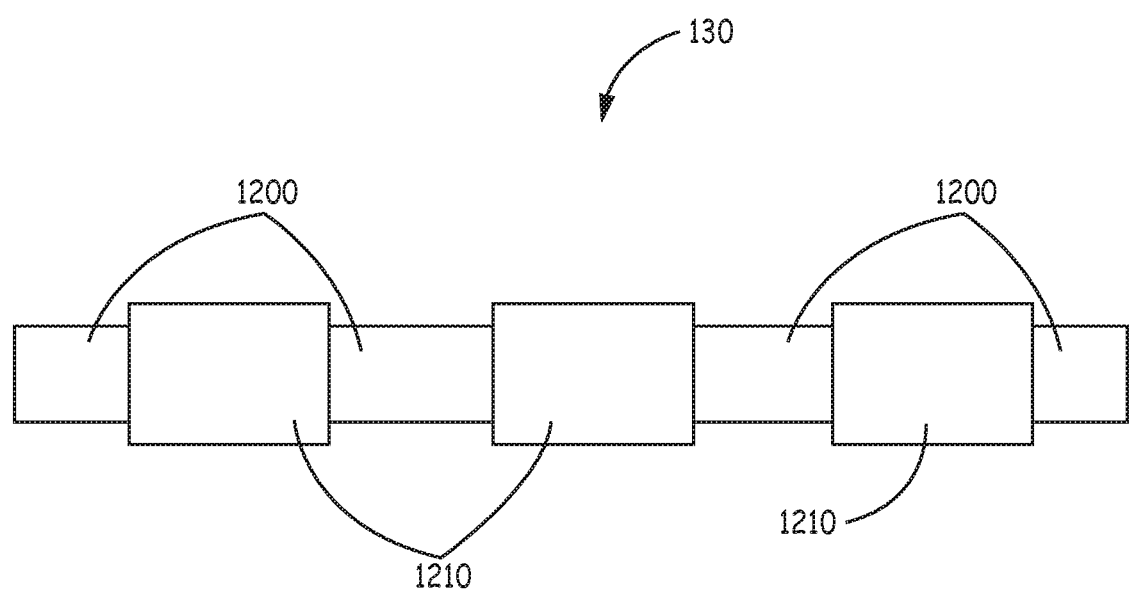
FIG. 12 is a side view of different types of conduit in series.

Portions of the conduit 130 can comprise different elements. In some embodiments a system 100 can include conduit 130, and the conduit 130 comprises first conduit members 1200 and second conduit members 1210, as shown in FIG. 12. The first conduit members 1200 can comprise conduit 130, such as shown in FIGS. 2 and 3. The second conduit members 1210 can comprise one or more of the following conduit 130, a liner 400, a core 600, and a foam insert 900.

In some embodiments conduit 130 will comprise mostly standard pipe (represented by first conduit members 1200) and coupling portions (represented by second conduit members 1210). The coupling portions can couple portions of piping together, additionally the coupling portions could serve to prevent gas flow through the conduit 130 in the event of a fire.

In an embodiment with portions of first conduit members 1200 and second conduit members 1210 there can be an aperture 200 with a substantially consistent size, such as having a constant inside diameter along the conduit 130. In this embodiment, the outside diameter of the second conduit members 1210 can be larger than the outside diameter of the second conduit 1210 members, such as to allow space within the second conduit members 1210 for one or more of a liner 400, a core 600, and a foam insert 900.

In an embodiment with portions of first conduit members 1200 and second conduit members 1210 there can be a substantially consistent outside diameter of the conduit 130 even between the first conduit members 1200 and the second conduit members 1210. In this embodiment, the aperture 200 of the second conduit members 1210 can be smaller than the aperture 200 of the first conduit members 1200, such as if one or more of the following occupy space within the aperture 200 of the second conduit members 1210: a liner 400, a core 600, and a foam insert 900.

In an embodiment with portions of first conduit members 1200 and second conduit members 1210 there can be an aperture 200 with a substantially consistent size along the conduit 130, as well as a substantially consistent outside diameter. In this embodiment, the distance between the inner wall 210 and the outer wall 220 can be smaller in the second conduit members 1210 than the first conduit members 1200, such as to allow space for one or more of the following: a liner 400, a core 600, and a foam insert 900.

Figure 13:
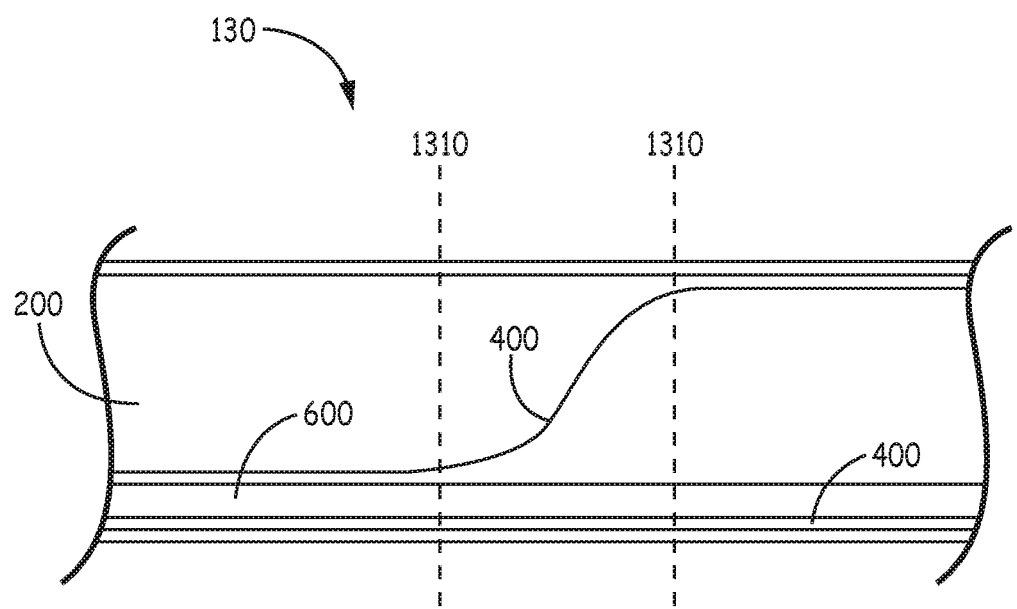
FIG. 13 is a side view of conduit that has been partially exposed to elevated temperatures.

As shown in FIG. 13, in certain implementations only a portion of the conduit 130 will be affected by a fire or increased heat. The portion of the conduit 130 to the left of reference line 1300 has been affected by a fire or increased heat, and the portion of the conduit 130 to the right of the reference line 1300 is unaffected by the heat. It should be noted that the gas could have been travelling in either direction through the aperture 200, prior to the aperture 200 being closed. The portion of conduit between reference line 1300 and reference line 1310 has been affected by heat; however there has not been enough heat to contract the liner 400 to completely close the aperture 400. The portion of the conduit 130 to the left of reference line 1310 has been affect by enough heat to completely close aperture 200, such that gas would be prevented from flowing through the conduit 130.

Figure 14:
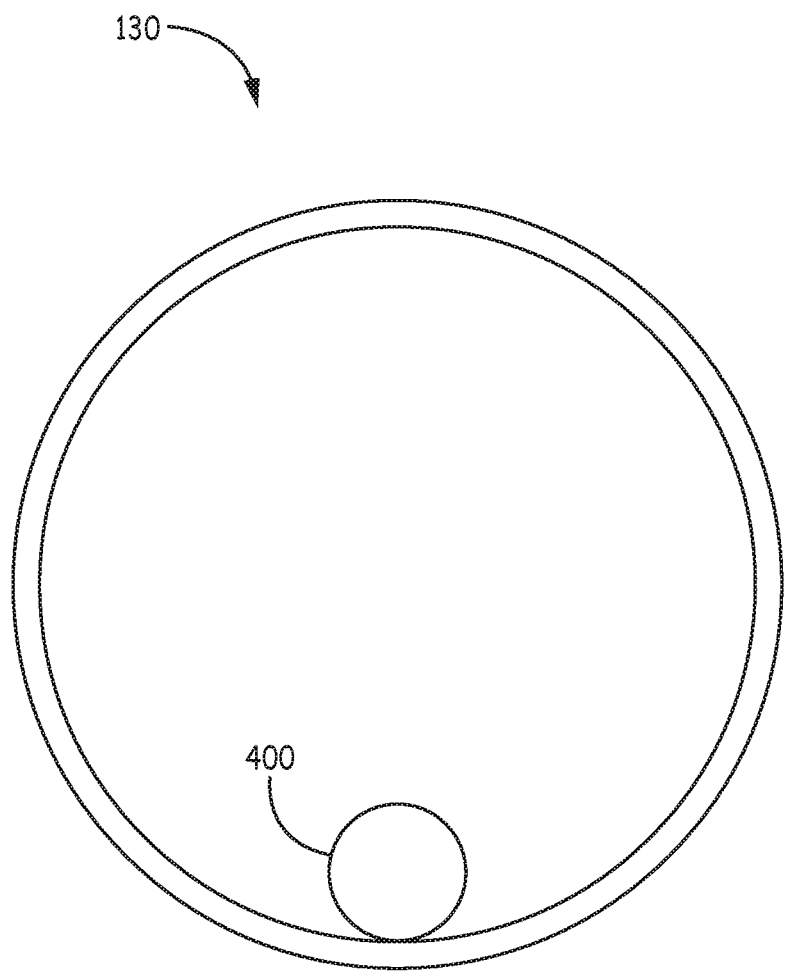
FIG. 14 is an end cross-sectional view of conduit with a liner after it has been exposed to heat.
Figure 15:
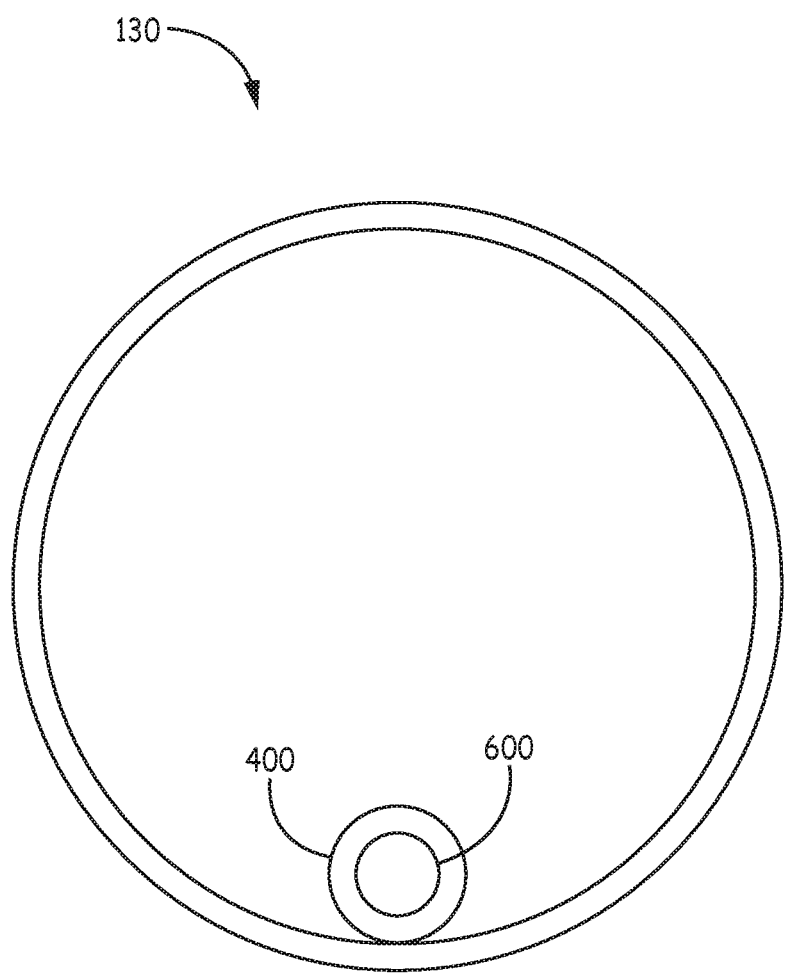
FIG. 15 is an end cross-sectional view of conduit with a liner and a core after it has been exposed to heat.
Figure 16:
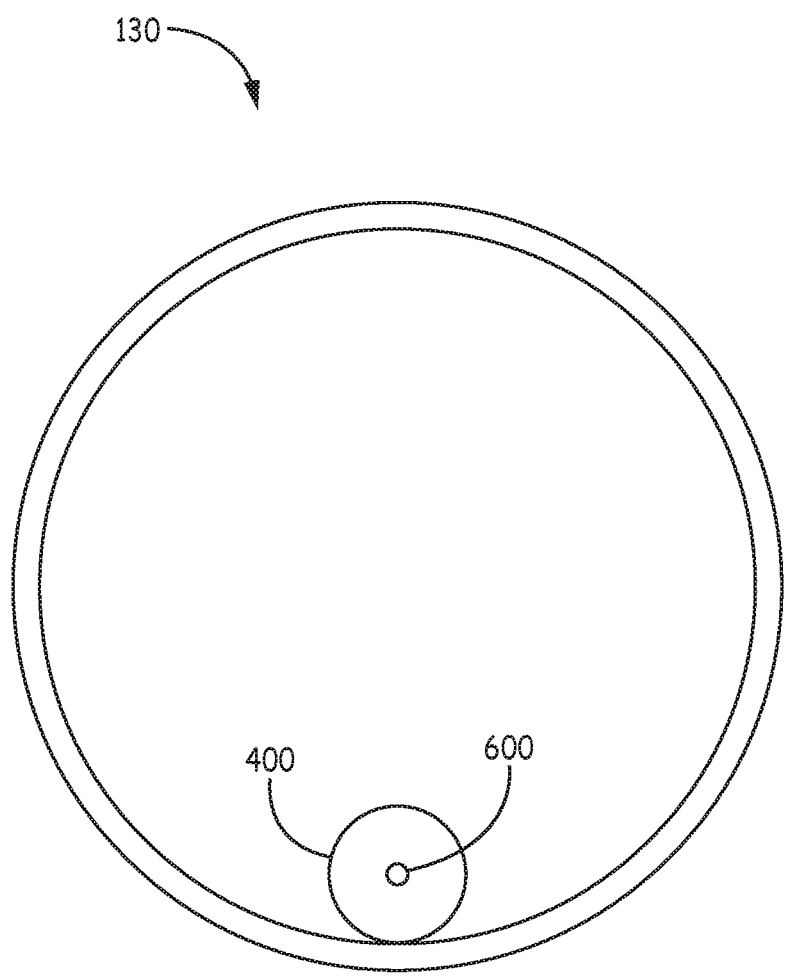
FIG. 16 is an end cross-sectional view of conduit with a liner and a core after it has been exposed to heat.

FIGS. 14, 15, and 16 show cross-sectional views of conduit that has been exposed to sufficient heat to completely close a portion of aperture 200. FIG. 14 has closed the aperture without a core. FIG. 15 has closed the aperture with the liner 400 and the core 600. FIG. 16 has closed the aperture with the liner 400 and a core 600 that has changed shape and size because of exposure to heat.

In an embodiment, a component (such as a core or a liner) disposed inside the aperture 200 can be configured to expand when exposed to an elevated temperature, such as a fire. When the component expands it can interrupt, terminate, or at least partially impede the flow of fluid through the conduit 130.

Figure 17:
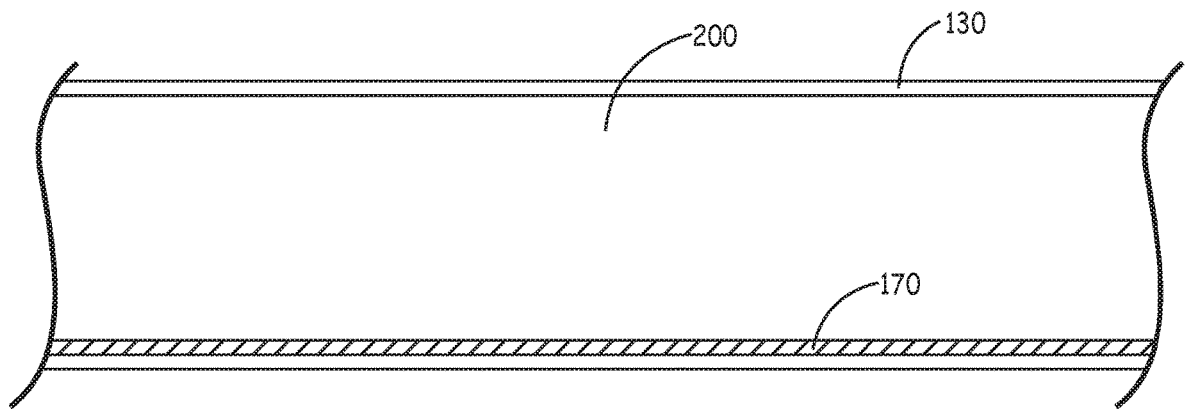
FIG. 17 is a side cross-sectional view of conduit, according to an embodiment.
Figure 18:
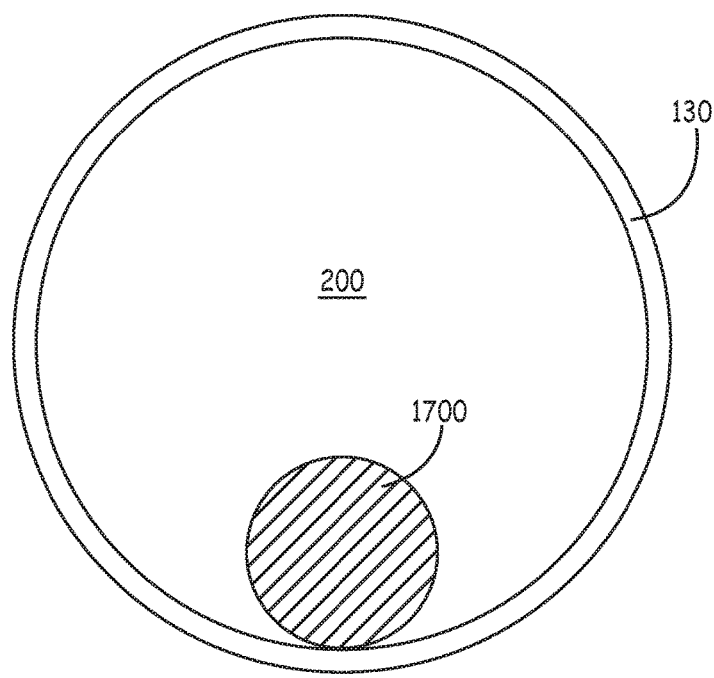
FIG. 18 is an end cross-sectional view of conduit with a core, according to an embodiment.

In an embodiment, a conduit 130 can include a core that expands when exposed to an increase in temperature. FIG. 17 shows a cross-sectional view of conduit 130 with a core 1700 disposed within the conduit 130. FIG. 18 shows an end view of conduit 130 with a core 1700 disposed within the conduit 130. The core 1700 can be configured, such that when the core 1700 is exposed to an increase in temperature, such as a fire, the core 1700 expands. When the core 1700 expands, the core 1700 can occupy the entire aperture 200 along a cross-section of the conduit 130, or at least a significant portion of the aperture 200 along a cross-section, such that the flow of any fluid through the conduit 130 is substantially interrupted or terminated.

The core 1700 can include a heat activated blowing agent. The heat activated blow agent can be blended with a polymer, such as ethyl vinyl acetate or low density polyethylene. When activated by heat, the blowing agent can give off a gas, such as in the polymer that it is blended with. The gas can result in bubbles in the heat softened polymer. The bubbles can cause the polymer to expand, such as to limit the flow through the conduit 130.

In an embodiment, the core 1700 can substantially return to its original shape and size when the elevated heat is removed, such that the core 1700 returns to its normal temperature. When the core 1700 is returned to its original shape and size, the aperture 200 can be reopened, such as to allow the flow of fluid through the conduit 130 to restart. In an embodiment, the core 1700 can include a liquid, that when heated expands the core 1700. When the liquid included in the core 1700 is cooled, such as when the elevated temperature has dissipated, the liquid can contract and core 1700 can substantially return to its pre-expanded shape and size. The liquid can include a set point temperature, at which the liquid expands into a vapor, such as to stop flow of fluid through the conduit.

Figure 19:
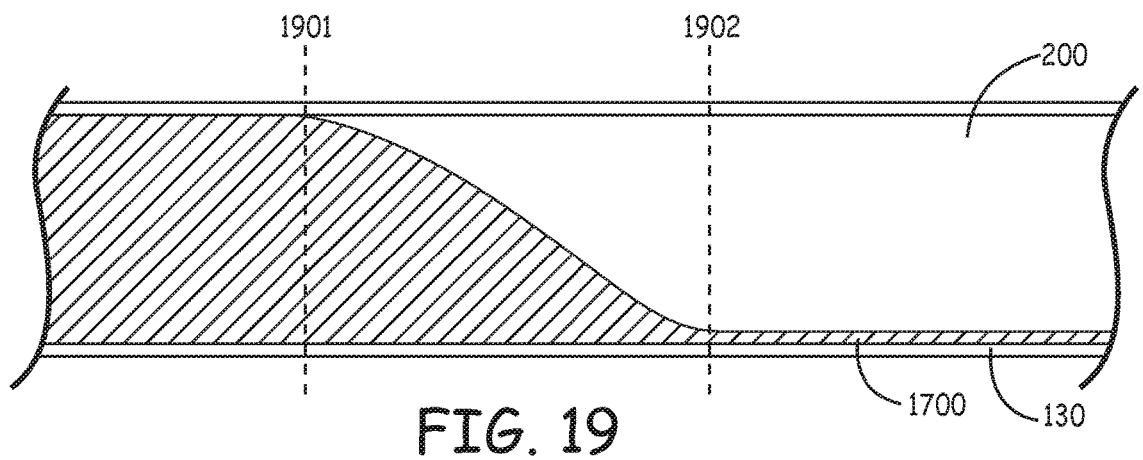
FIG. 19 is a side cross-sectional view of conduit, according to an embodiment.
Figure 20A:
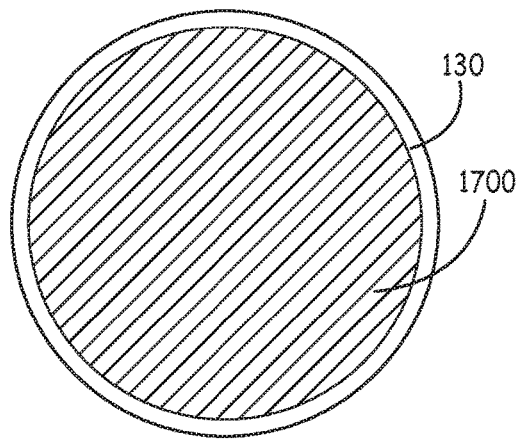
FIG. 20A is an end cross-sectional view of conduit with a core, according to an embodiment.
Figure 20B:
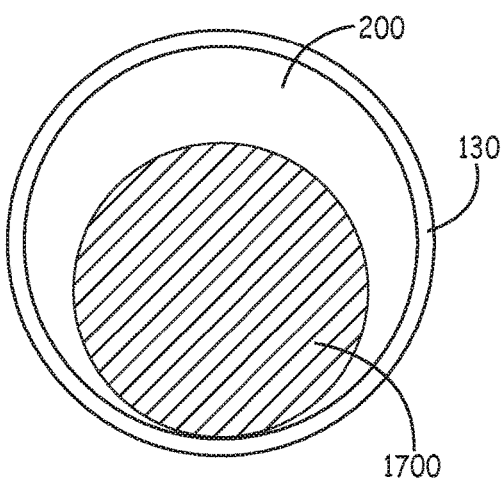
FIG. 20B is an end cross-sectional view of conduit with a core, according to an embodiment.

The core 1700 can include a material that is non-flammable and expands when subjected to an increase in temperature, as shown in FIGS. 19 and 20A-20B. In FIG. 19 the portion to the left of reference line 1901 has been exposed to a sufficient amount of heat, such that the core 1700 has expanded to at least substantially occupy the aperture 200, such as to terminate fluid flow through the conduit 130. The portion between reference line 1901 and reference line 1902 has been exposed to an increase in temperature, such that the core 1700 has started to expand. However, the core 1700 does not occupy the entire aperture 200, such that the flow of fluids is not entirely terminated. The portion to the right of reference line 1902 has not been subjected to a sufficient increase in heat to start to expand the core 1700.

Figure 20C:
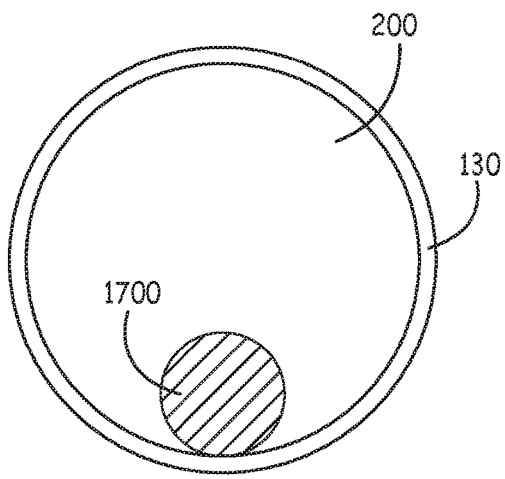
FIG. 20C is an end cross-sectional view of conduit with a core, according to an embodiment.

FIG. 20A shows a cross section of a portion of the conduit 130 to the left of reference line 1901 in FIG. 19. The core 1700 has expanded to a sufficient size to substantially terminate the flow of fluid through the conduit 130. FIG. 20B shows a cross section of a portion of the conduit 130 between reference line 1901 and reference line 1902 in FIG. 19. The core 1700 has expanded to partially impede the flow of fluids through the conduit 130. However, the core 1700 (in FIG. 20B) has not expanded to a size that terminates the flow of fluids through the conduit 130. FIG. 20C shows a cross section of a portion of the conduit 130 to the right of reference line 1902 in FIG. 19. The core 1700 has not been exposed to sufficient heat to expand the core 1700.

Figure 21:
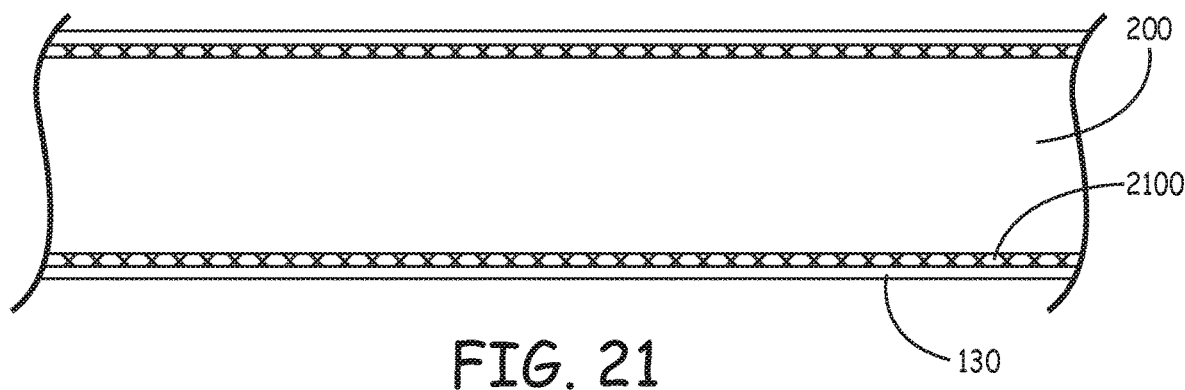
FIG. 21 is a side cross-sectional view of conduit, according to an embodiment.
Figure 22:
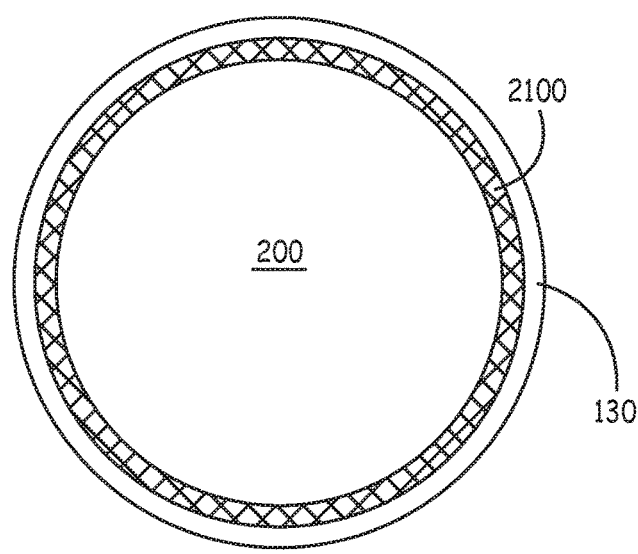
FIG. 22 is a side cross-sectional view of conduit, according to an embodiment.

In an embodiment, the conduit can include a liner disposed within the aperture, and the liner can be configured to expand in response to an increase in temperature. FIG. 21 shows a cross-sectional view of conduit 130 with a liner 2100 disposed within the conduit 130, such as around the inside wall 210 of the conduit. FIG. 22 shows an end view of conduit 130 with a liner 2100 disposed within the conduit 130. The liner 2100 can at least partially define the aperture 200 that extends along at least a portion of the conduit 130. The liner 2100 can be configured, such that when the liner 2100 is exposed to an increase in temperature, such as a fire, the liner 2100 expands. When the liner 2100 expands, the liner 2100 can occupy the entire aperture 200 along a cross-section of the conduit 130, or at least a significant portion of the aperture 200 along a cross-section, such that the flow of any fluid through the conduit 130 is substantially interrupted or terminated.

The liner 2100 can include a heat activated blowing agent. The heat activated blow agent can be blended with a polymer, such as ethyl vinyl acetate or low density polyethylene. When activated by heat, the blowing agent can give off a gas, such as in the polymer that it is blended with. The gas can result in bubbles in the heat softened polymer. The bubbles can cause the polymer to expand, such as to limit the flow through the conduit 130.

In an embodiment, the liner 2100 can substantially return to its original shape and size when the elevated heat is removed, such that the liner 2100 returns to its normal temperature. When the liner 2100 is returned to its original shape and size, the aperture 200 can be reopened, such as to allow the flow of fluid through the conduit 130 to restart. In an embodiment, the liner 2100 can include a liquid, that when heated expands the liner 2100. When the liquid included in the liner 2100 is cooled, such as when the elevated temperature has dissipated, the liquid can contract and liner 2100 can substantially return to its pre-expanded shape and size. The liquid can include a set point temperature, at which the liquid expands into a vapor, such as to stop flow of fluid through the conduit.

Figure 23:
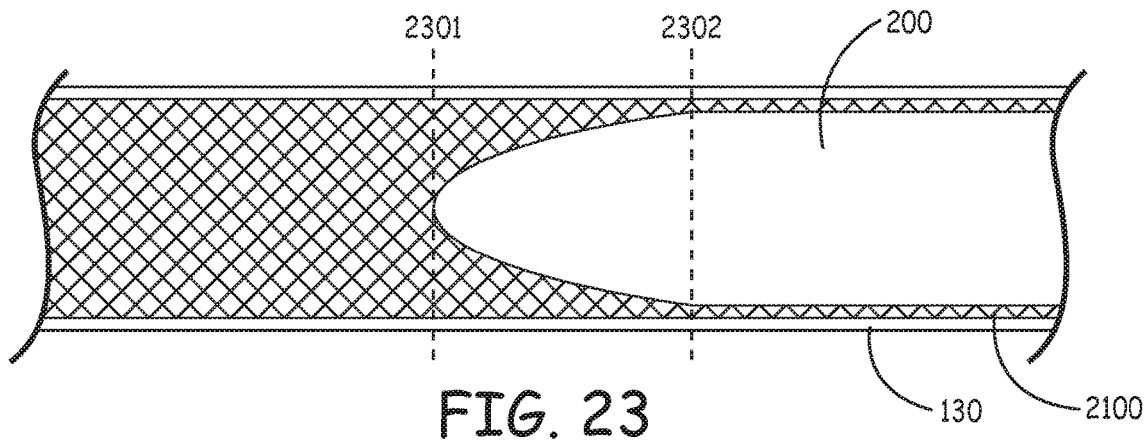
FIG. 23 is a side cross-sectional view of conduit, according to an embodiment.
Figure 24A:
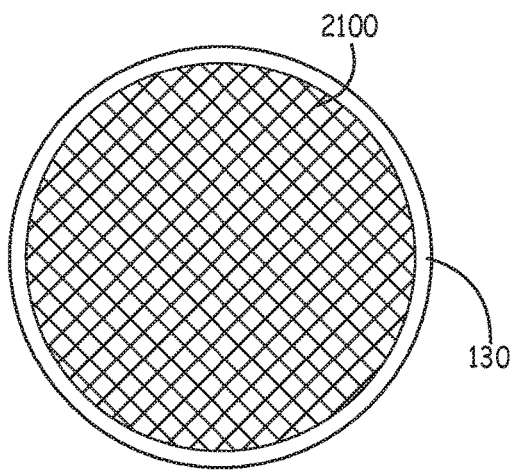
FIG. 24A is an end cross-sectional view of conduit with a core, according to an embodiment.
Figure 24B:
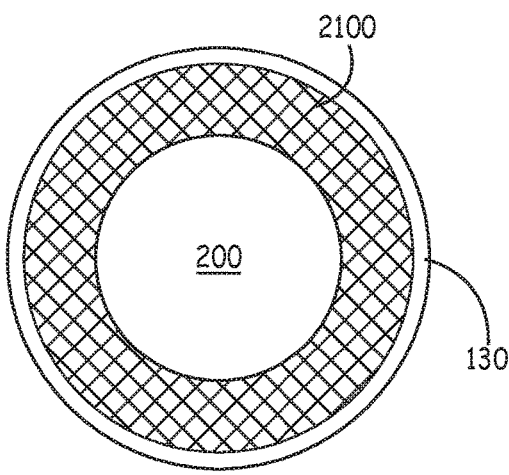
FIG. 24B is an end cross-sectional view of conduit with a core, according to an embodiment.

The liner 2100 can include a material that is non-flammable and expands when subjected to an increase in temperature, as shown in FIGS. 23 and 24A-24B. In FIG. 23 the portion to the left of reference line 2301 has been exposed to a sufficient amount of heat, such that the liner 2100 has expanded to at least substantially occupy the aperture 200, such as to terminate fluid flow through the conduit 130. The portion between reference line 2301 and reference line 2302 has been exposed to an increase in temperature, such that the liner 2100 has started to expand. However, the liner 2100 does not occupy the entire aperture 200, such that the flow of fluids is not entirely terminated. The portion to the right of reference line 2502 has not been subjected to a sufficient increase in heat to start to expand the liner 2100.

Figure 24C:
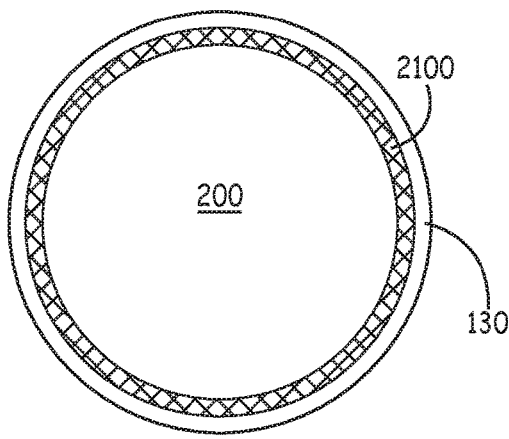
FIG. 24C is an end cross-sectional view of conduit with a core, according to an embodiment.

FIG. 24A shows a cross section of a portion of the conduit 130 to the left of reference line 2301 in FIG. 23. The liner 2100 has expanded to a sufficient size to substantially terminate the flow of fluid through the conduit 130. FIG. 24B shows a cross section of a portion of the conduit 130 between reference line 2301 and reference line 2302 in FIG. 23. The liner 2100 has expanded to partially impede the flow of fluids through the conduit 130. However, the liner 2100 (in FIG. 24B) has not expanded to a size that terminates the flow of fluids through the conduit 130. FIG. 24C shows a cross section of a portion of the conduit 130 to the right of reference line 2302 in FIG. 23. The liner 2100 has not been exposed to sufficient heat to expand the liner 2100.

Figure 25:
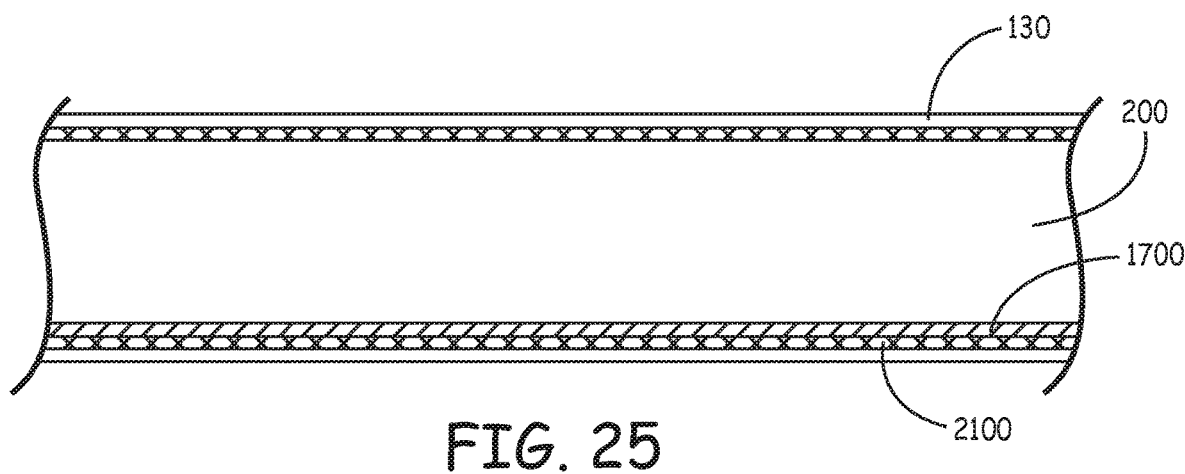
FIG. 25 is a side cross-sectional view of conduit, according to an embodiment.
Figure 26:
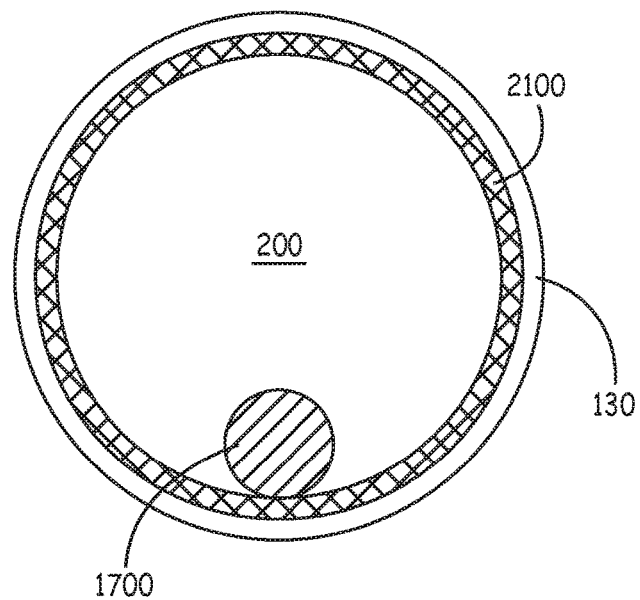
FIG. 26 is a side cross-sectional view of conduit, according to an embodiment.

In an embodiment, a conduit 130 can include a core and a liner that both expand when exposed to an increase in temperature. FIG. 25 shows a cross-sectional view of conduit 130 with a core 1700 disposed within the conduit 130, such as within the aperture 200, and a liner 2100 disposed within the conduit 130, such as around the inside wall 210 of the conduit. FIG. 26 shows an end view of conduit 130 with a core 1700 and a liner 2100 disposed within the conduit 130. The core 1700 and the liner 2100 can be configured, such that when the core 1700 and the liner 2100 are exposed to an increase in temperature, such as a fire, the core 1700 and the liner 2100 expand. When the core 1700 and the liner 2100 expand, the core 1700 and the liner 2100 can occupy the entire aperture 200 along a cross-section of the conduit 130, or at least a significant portion of the aperture 200 along a cross-section, such that the flow of any fluid through the conduit 130 is substantially interrupted or terminated.

Figure 27:
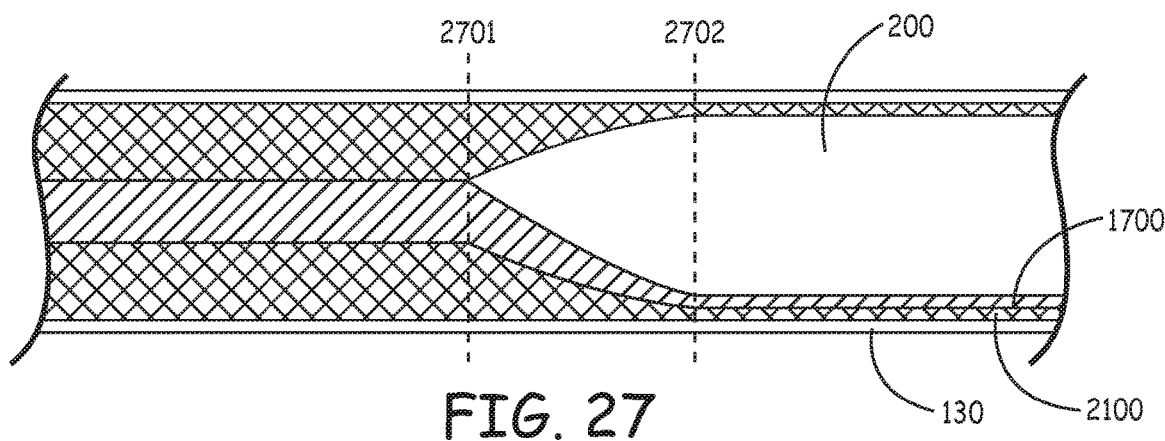
FIG. 27 is a side cross-sectional view of conduit, according to an embodiment.
Figure 28A:
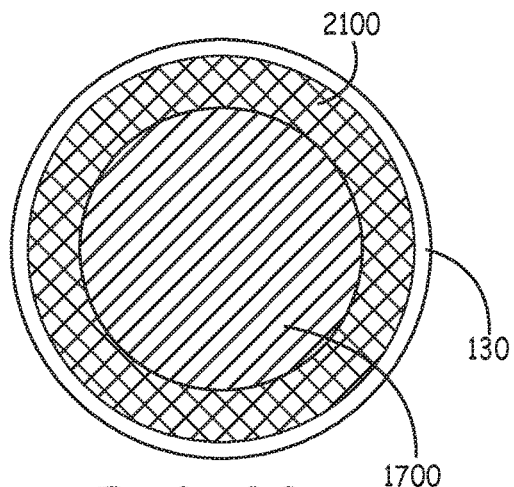
FIG. 28A is an end cross-sectional view of conduit with a core, according to an embodiment.
Figure 28B:
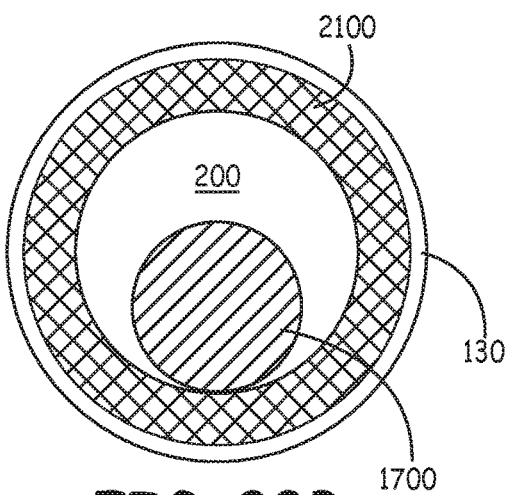
FIG. 28B is an end cross-sectional view of conduit with a core, according to an embodiment.

The core 1700 and the liner 2100 can include a material that is non-flammable and expands when subjected to an increase in temperature, as shown in FIGS. 27 and 28A-28B. In some embodiments, the core 1700 and the liner 2100 can include the same material(s). In FIG. 27 the portion to the left of reference line 2701 has been exposed to a sufficient amount of heat, such that the core 1700 and the liner 2100 have expanded to at least substantially occupy the aperture 200, such as to terminate fluid flow through the conduit 130. The portion between reference line 2701 and reference line 2702 has been exposed to an increase in temperature, such that the core 1700 and the liner 2100 have started to expand. However, the core 1700 and the liner 2100 do not occupy the entire aperture 200, such that the flow of fluids is not entirely terminated. The portion to the right of reference line 2702 has not been subjected to a sufficient increase in heat to start to expand the core 1700 or the liner 2100.

Figure 28C:
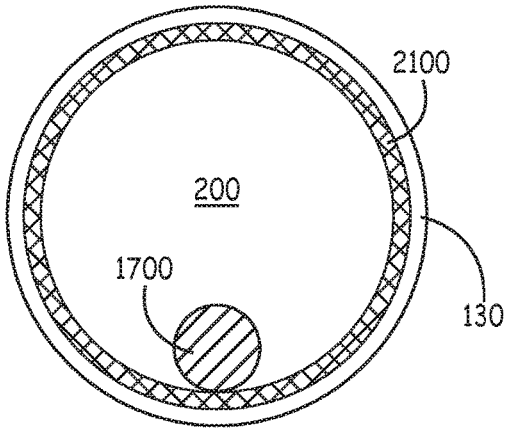
FIG. 28C is an end cross-sectional view of conduit with a core, according to an embodiment.

FIG. 28A shows a cross section of a portion of the conduit 130 to the left of reference line 2701 in FIG. 27. The liner core 1700 and the liner 2100 have expanded to a sufficient size to substantially terminate the flow of fluid through the conduit 130. FIG. 28B shows a cross section of a portion of the conduit 130 between reference line 2701 and reference line 2702 in FIG. 27. The core 1700 and the liner 2100 have expanded to partially impede the flow of fluids through the conduit 130. However, the core 1700 and the liner 2100 (in FIG. 28B) have not expanded to a size that terminates the flow of fluids through the conduit 130. FIG. 28C shows a cross section of a portion of the conduit 130 to the right of reference line 2702 in FIG. 27. The core 1700 and the liner 2100 have not been exposed to sufficient heat to expand the core 1700 or the liner 2100.

Figure 29:
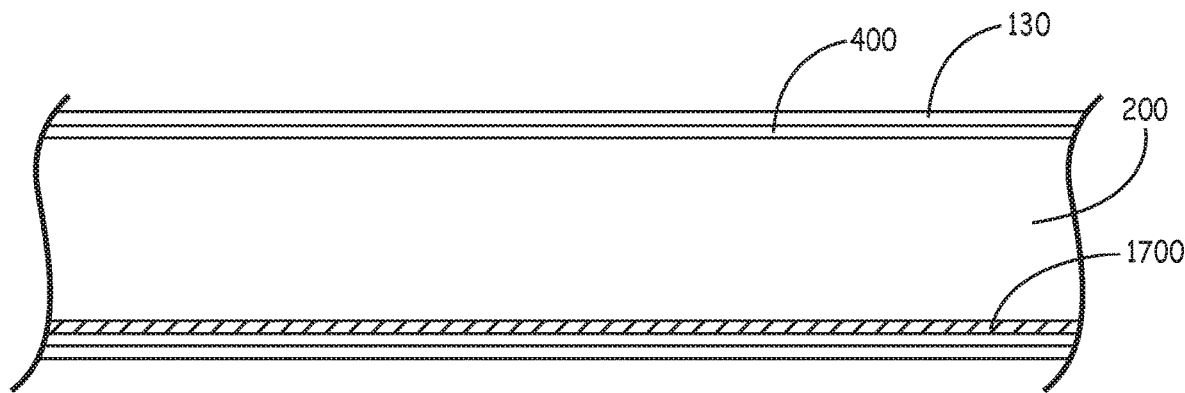
FIG. 29 is a side cross-sectional view of conduit, according to an embodiment.

In an embodiment, a conduit 130 can include a core that expands when exposed to an increase in temperature and a liner that shrinks or collapses when exposed to an increase in temperature. FIG. 29 shows a side cross section of conduit 130 with liner 400 that shrinks and core 1700 that expands, such as to interrupt or terminate the flow of fluid through the conduit 130. In an embodiment, a liner 400 can be disposed around the inside wall 210 of the conduit 130. As described above in reference to FIG. 13, the liner 400 can shrink or collapse to close off at least a portion of the aperture 200, such as to interrupt or terminate the flow of fluid through the conduit 130. In an embodiment, a core 1700 can be disposed in the conduit 130. As described in reference to FIGS. 17-20, the core 1700 can expand to close off at least a portion of the aperture 200, such as to interrupt or terminate the flow of fluid through the conduit 130.

In an embodiment, the conduit 130 can include a core 1700 that expands and a liner 400 that shrinks or collapses, disposed in the aperture 200. The core 1700 and the liner 400, in concert, can block the flow of fluids through the aperture 200, such as when the conduit is exposed to an increase in temperature.

Figure 30:
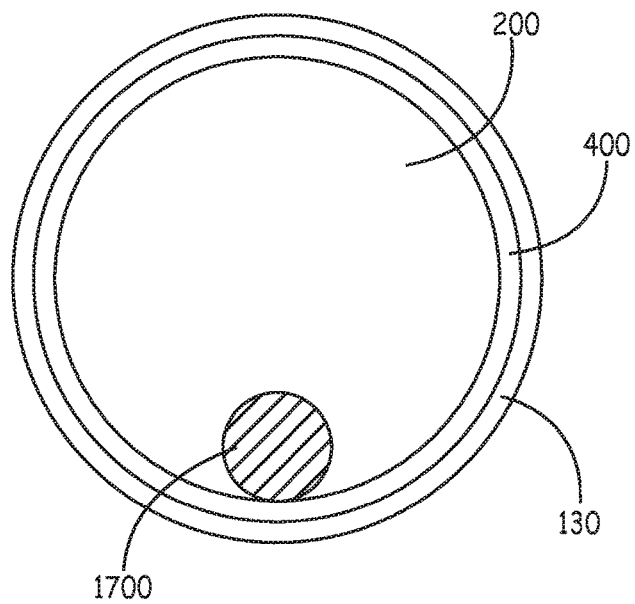
FIG. 30 is a side cross-sectional view of conduit, according to an embodiment.

FIG. 30 shows an end view of a cross section of conduit 130 with liner 400 that shrinks and core 1700 that expands. As discussed above, the liner 400 can be disposed on the inside wall 210 or inner surface of the conduit 130. The liner 400 can define at least a portion of the aperture 200. In normal conditions, prior to being exposed to an increase in temperature, fluid can flow through the aperture 200. When the liner 400 or the core 1700 is exposed to an increase in temperature, the liner 400, the core 1700, or both the liner 400 and the core 1700 can close off the aperture 200 to stop the flow of fluid through the conduit 130. In an embodiment, the liner 400 can shrink or collapse to close off at least a portion of the aperture 200 and a core 1700 can expand to close off at least a portion of the aperture 200.

Figure 31:
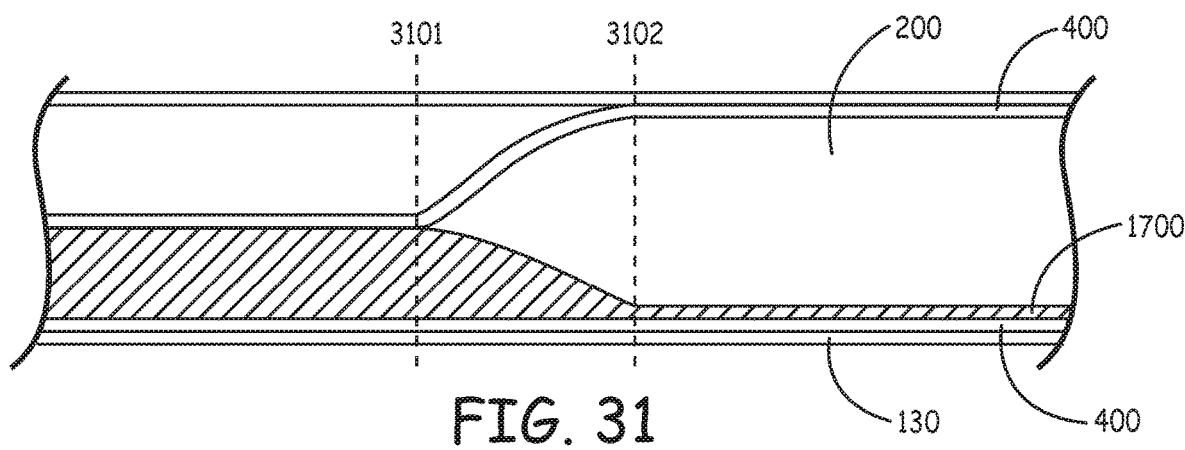
FIG. 31 is a side cross-sectional view of conduit, according to an embodiment.

In FIG. 31, the portion to the left of reference line 3101 has been exposed to a sufficient amount of heat, such that the core 1700 has expanded and the liner 400 has shrunk or collapsed to at least substantially occupy the aperture 200, such as to terminate fluid flow through the conduit 130. The portion between reference line 3101 and reference line 3102 has been exposed to an increase in temperature, such that the core 1700 has started to expand and the liner 400 has started to collapse or shrink. However, the core 1700 and liner 400 do not occupy the entire aperture 200, such that the flow of fluids is not entirely terminated. The portion to the right of reference line 3102 has not been subjected to a sufficient increase in heat to start to expand the core 1700 or shrink or collapse the liner 400.

Figure 32A:
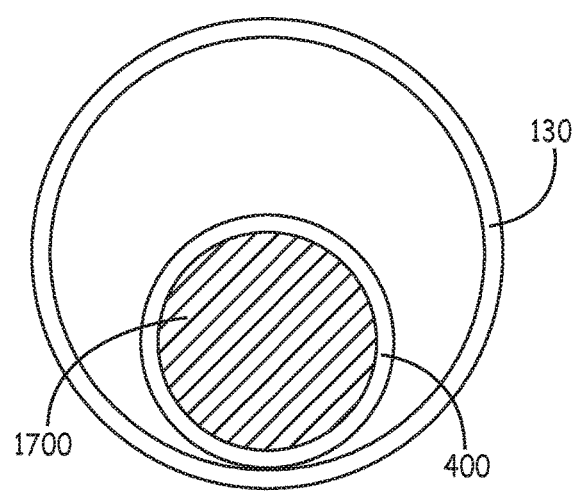
FIG. 32A is an end cross-sectional view of conduit with a core, according to an embodiment.
Figure 32B:
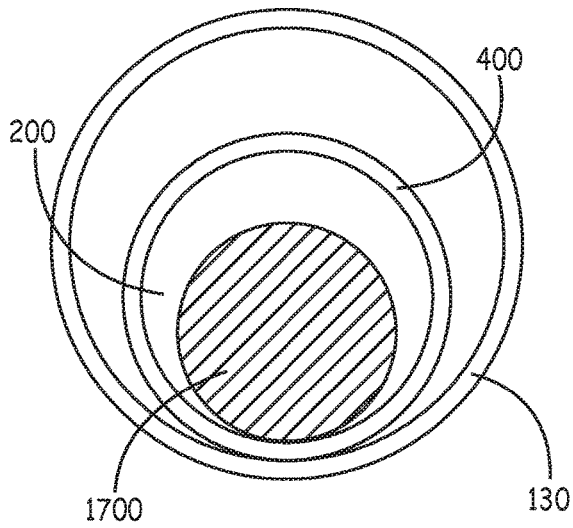
FIG. 32B is an end cross-sectional view of conduit with a core, according to an embodiment.
Figure 32C:
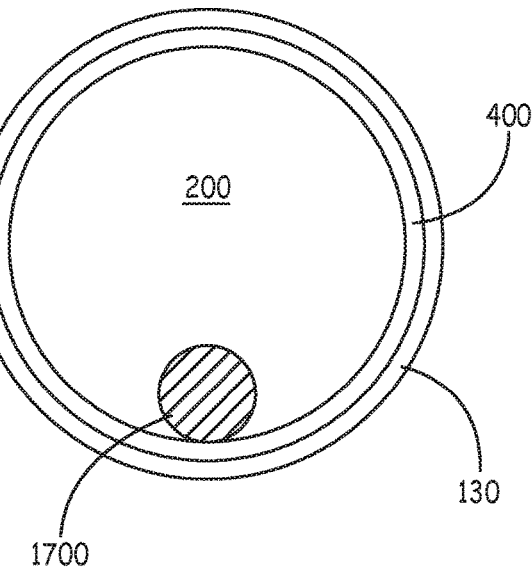
FIG. 32C is an end cross-sectional view of conduit with a core, according to an embodiment.

FIG. 32A shows a cross section of a portion of the conduit 130 to the left of reference line 3101 in FIG. 31. The core 1700 has expanded and the liner 400 has shrunk or collapsed to a sufficient size to substantially terminate the flow of fluid through the conduit 130. FIG. 32B shows a cross section of a portion of the conduit 130 between reference line 3101 and reference line 3102 in FIG. 31. The core 1700 has expanded and the liner 400 has shrunk to partially impede the flow of fluids through the conduit 130. However, the core 1700 has not expanded and the liner 400 has not shrunk to sizes that terminate the flow of fluids through the conduit 130, such that at least a portion of the aperture 200 remains open. FIG. 32C shows a cross section of a portion of the conduit 130 to the right of reference line 3102 in FIG. 31. The core 1700 and liner 400 have not been exposed to sufficient heat to expand the core 1700 or shrink the liner 400.

Figure 33:
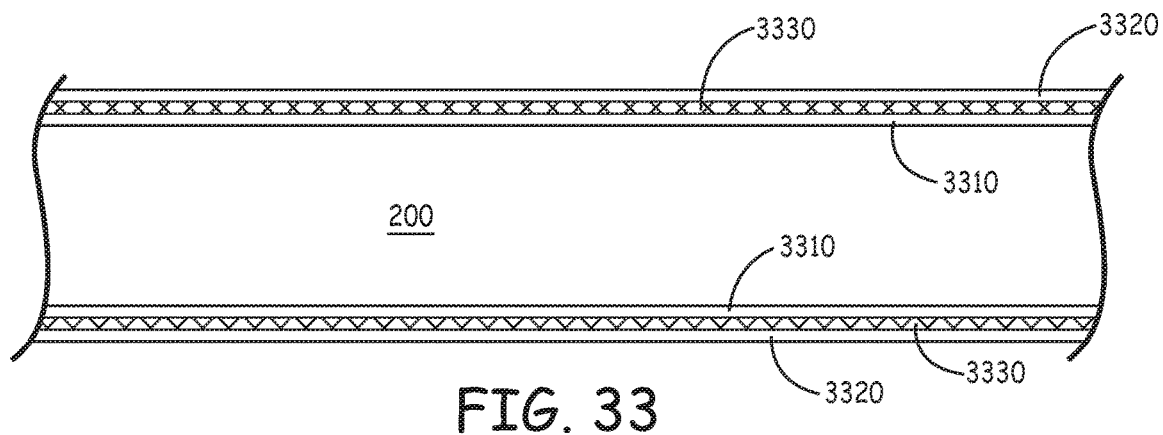
FIG. 33 is a side cross-sectional view of conduit, according to an embodiment.

In an embodiment, a conduit 130 can include an inner conduit and an outer conduit, with a liner disposed between the inner conduit and the outer conduit. FIG. 33 shows a cross section of conduit 130, according to an embodiment. Conduit 130 can include an inner conduit 3310 and an outer conduit 3320. In an embodiment, a liner 3330 can be disposed between the inner conduit 3310 and the outer conduit 3320. The inner conduit 3310 can define the aperture 200. The aperture 200 can be configured to allow fluids to pass through the conduit 130.

The inner conduit 3310 can be weaker than the outer conduit 3320, such as the outer conduit 3320 can withstand more force than the inner conduit 3310. The inner conduit 3310 can be weaker than the outer conduit 3320, such as the inner conduit 3310 can have a lower failure point than the outer conduit 3320. The failure point can reference an amount of force, such as pressure, that causes a portion of conduit to collapse, fracture, burst, crack, expand, shrink, or otherwise fail to maintain its previous shape or configuration.

The liner 3330 can expand when it is exposed to an increase in temperature, such as a fire. The liner 3330 can apply a pressure to the inner conduit 3310 and the outer conduit 3320, such as when the liner 3330 is expanding. The outer conduit 3320 can withstand more force than the inner conduit 3310, such that the liner 3330 is forced to expand inward. The liner 3330 can crush or collapse the inner conduit 3310, such that the liner 3330, when expanded, can interrupt or terminate the flow of fluid through the conduit.

Figure 34:
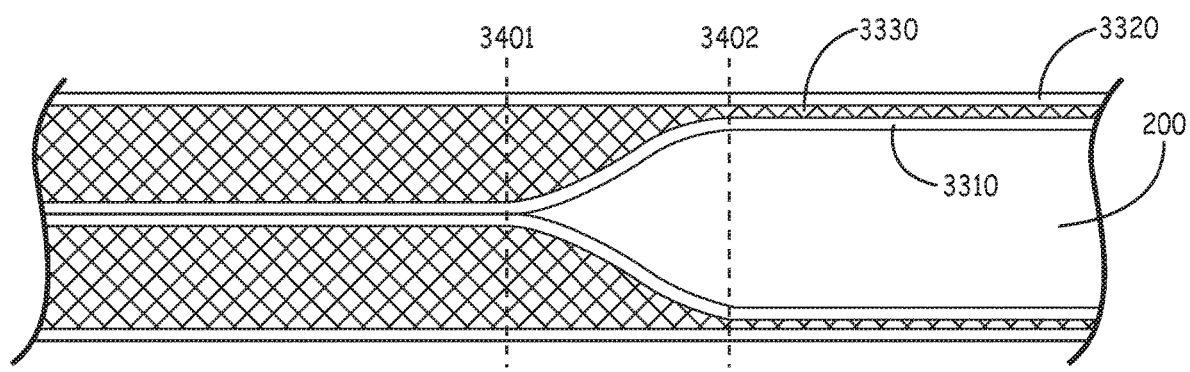
FIG. 34 is a side cross-sectional view of conduit, according to an embodiment.

In FIG. 34 the portion to the left of reference line 3401 has been exposed to a sufficient amount of heat, such that the liner 3330 has expanded and the inner conduit 3310 has collapsed to at least substantially occupy the aperture 200, such as to terminate fluid flow through the conduit 130. The portion between reference line 3401 and reference line 3402 has been exposed to an increase in temperature, such that the liner 3330 has started to expand and the inner conduit 3310 has started to collapse. However, the liner 3330 does not occupy the entire aperture 200, such that the flow of fluids is not entirely terminated. The portion to the right of reference line 3402 has not been subjected to a sufficient increase in heat to start to expand the core 1700 or shrink or collapse the liner 400.

Figure 35:
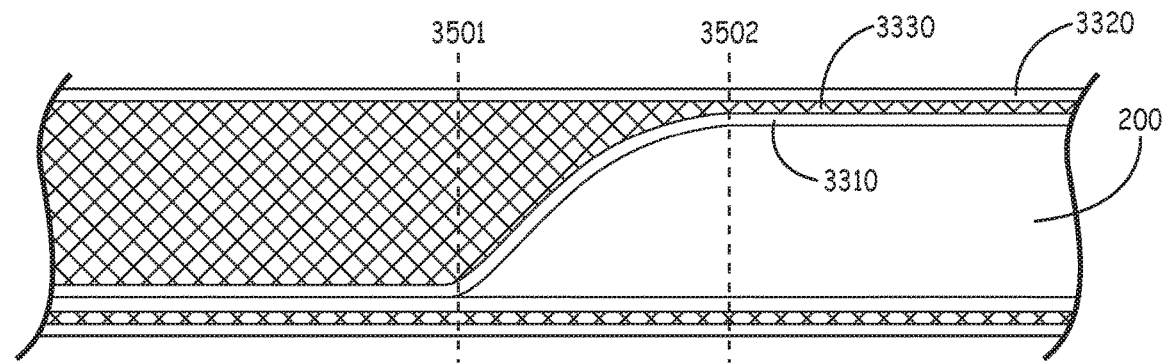
FIG. 35 is a side cross-sectional view of conduit, according to an embodiment.

In FIG. 35, the top portion of the conduit 130 has been exposed to more heat than the bottom portion of the conduit 130. Portions below reference line 3503 have not been exposed to sufficient heat to expand the liner 3330. Some portions above the reference line 3503 have been exposed to an increase in temperature. The portion to the left of reference line 3501 has been exposed to a sufficient amount of heat, such that the liner 3330 has expanded and the inner conduit 3310 has collapsed to at least substantially occupy the aperture 200, such as to terminate fluid flow through the conduit 130. The portion between reference line 3501 and reference line 3502 has been exposed to an increase in temperature, such that the liner 3330 has started to expand and the inner conduit 3310 has started to collapse. However, the liner 3330 does not occupy the entire aperture 200, such that the flow of fluids is not entirely terminated. The portion to the right of reference line 3502 has not been subjected to a sufficient increase in heat to start to expand the core 1700 or shrink or collapse the liner 400.

Figure 36:
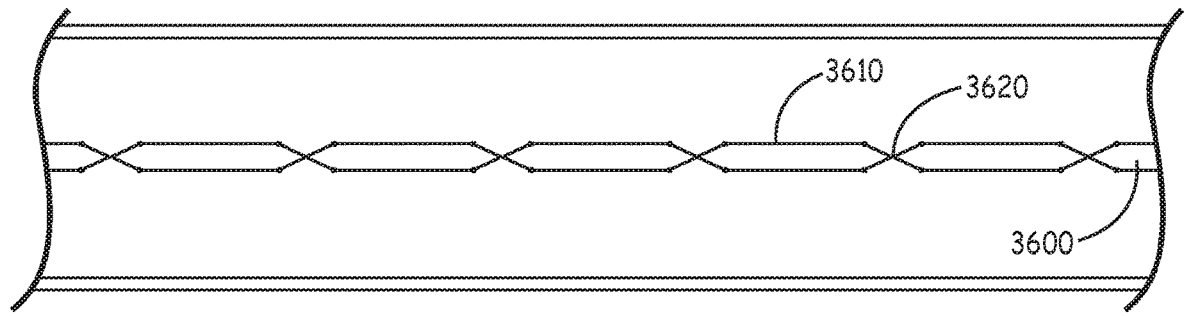
FIG. 36 is a side cross-sectional view of conduit, according to an embodiment.

In an embodiment, a conduit can include a core 3600 that expands when exposed to an increase in temperature. FIG. 36 shows a cross-sectional view of conduit with a core 3600 disposed within the conduit. The core 3600 can be configured, such that when the core 3600 is exposed to an increase in temperature, such as a fire, the core 3600 expands. When the core 3600 expands, the core 3600 can occupy the entire aperture 200 along a cross-section of the conduit, or at least a significant portion of the aperture 200 along a cross-section, such that the flow of any fluid through the conduit is substantially interrupted or terminated.

The core 3600 can include a plurality of segments 3610. Each segment 3610 can be isolated from the other segments, such that they do not have fluid communication. The segments 3610 can be isolated at isolation points 3620. In an embodiment, the isolation points 3620 can be connections between segments 3610, such as when each segment 3610 is separate from the other segments 3610. In an embodiment, the isolation points 3620 can be separations between segments 3610, such as when the segments are all part of a single component.

Each segment 3610 can include an elastic casing, such as a shell or housing that can expand or contract. Each segment 3610 can include liquid disposed inside of the casing. As the core 3600 is exposed to an increase in temperature, the liquid inside of the casing can be converted into a vapor and expand the casing. In an embodiment, a segment 3610 can include a stent mechanism, such as to aid in keeping the casing expanded.

Figure 37:
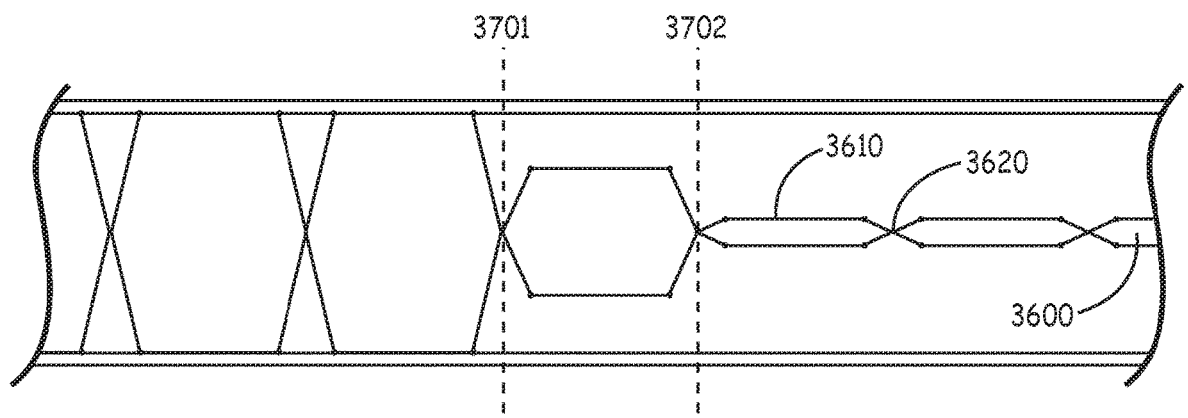
FIG. 37 is a side cross-sectional view of conduit, according to an embodiment.

The core 3600 can include a material that is non-flammable and expands when subjected to an increase in temperature, as shown in FIG. 37. In FIG. 23 the portion to the left of reference line 3701 has been exposed to a sufficient amount of heat, such that the core 3600 has expanded to at least substantially occupy the aperture, such as to terminate fluid flow through the conduit. The portion between reference line 3701 and reference line 3702 has been exposed to an increase in temperature, such that the core 3600 has started to expand. However, the core 3600 does not occupy the entire aperture, such that the flow of fluids is not entirely terminated. The portion to the right of reference line 3702 has not been subjected to a sufficient increase in heat to start to expand the core 3600.

Figure 38:
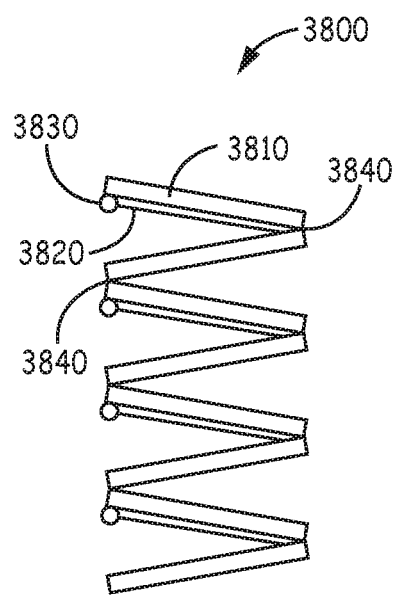
FIG. 38 is a front view of a stent mechanism in a collapsed configuration, according to an embodiment.
Figure 39:
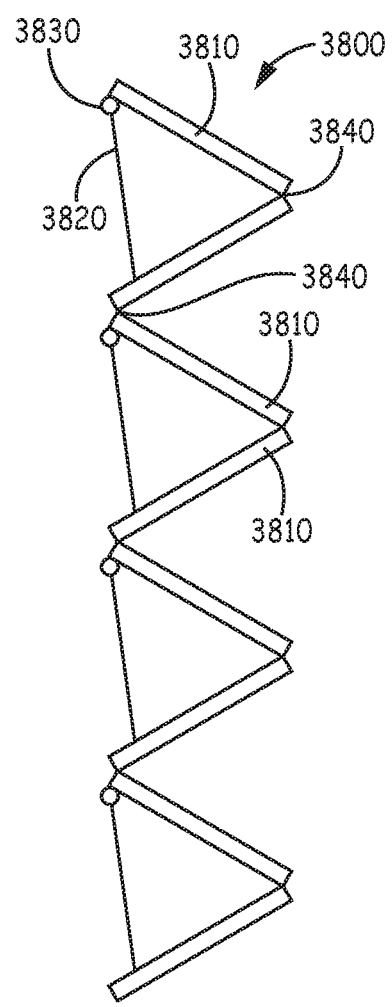
FIG. 39 is a front view of a stent mechanism in an expanded configuration, according to an embodiment.

FIG. 38 shows a stent mechanism 3800 in a collapsed position. FIG. 39 shows a stent mechanism 3800 in an expanded position. The stent mechanism 3800 can go from a collapsed position (as shown in FIG. 38) to an expanded position (as shown in FIG. 39). The stent mechanism 3800 can be in a collapsed position, such as when fluid is flow through the conduit, such as prior to the core 3600 being exposed to an increase in temperature. When the core 3600 is exposed to an increase in temperature, the core 3600 can expand. When the core 3600 expands, the stent mechanism 3800 can go from a collapsed position to an expanded position, such as to aid in keeping the core 3600 expanded.

The stent mechanism 3800 can include a plurality of stent segments 3810. A stent segment 3810 can be coupled to another stent segment 3810, such as at joints 3840. The stent segments 3810 can pivot with respect to other stent segments 3810, such as at joints 3840.

The stent mechanism 3800 can include a locking leg 3820. The locking leg 3820 can pivot with respect to a stent segment 3810 such as at joint 3830. The locking leg 3820 can pivot to be perpendicular to the wall of the conduit, when the stent mechanism 3800 is in an expanded position, such as to provide additional support for the stent mechanism to stay in an expanded position.

The liner or the core can include a cross-linked binding agent, such as allow the core or liner to adhere to the conduit. The liner or the core can include a flexible material, such as rubber or a flexible polymer. The flexible material can be carried by expanding the liner or the core and pressed or positioned against the walls of the conduit, such as to fill, occupy, or seal, a crack or other hole in the conduit. Sealing a crack or hole in the conduit can prevent fluid from flowing out of the conduit.

The liner or the core can include a fuse mechanism, such that once the fuse mechanism is exposed to a certain temperature, the fuse mechanism can initiate or propagate the liner or the core to expand, shrink, or collapse. In an embodiment, the liner or the core can start to expand, shrink, or collapse at a temperature below 200° C., such as 190° C., 180° C., 170° C., 160° C., 150° C., 125° C., 100° C., or 75° C. The fuse mechanism can be activated at a lower temperature, such as to start the production of gas to expand the core or liner earlier. The fuse mechanism can include single or multipart exothermic chemical reactions or the rapid oxidation of materials within the conduit.

In an embodiment, the core or the liner can include a thermal set component. The thermal set component can be configured to harden with an increase in temperature. In an embodiment, the thermal set component can be configured to harden at a temperature greater than temperature at which the core or liner starts to expand, shrink, or collapse. In an embodiment, the liner can be monolithic, such that it contains a consistent material throughout the liner. In an embodiment, the liner can include multiple layers. In an embodiment, the liner can be laminated.

The liner can include multiple layers and the layers can have different characteristics. In an embodiment, a layer, such as the outer most layer (the layer in contact with the inside surface of the conduit) can be a self-healing layers, such as a layer that can seal a puncture or a breach in the conduit. A second layer can include a thermoset polymer, such as a layer that can solidify at elevated temperature. Additional layers, with different characteristics are also possible.

Experiments

In order to evaluate the performance of an expandable liner made in accordance with an embodiment, experiments were conducted to determine how the expandable liner would perform under different conditions.

In a first test, a 0.04 inch expandable liner was disposed along the length of a 4 foot section of ¾ inch corrugated stainless steel tubing ("CSST"). The tubing was placed in a test fixture that was constructed like a wood wall made of wood 2×4s and ½ inch of SHEETROCK on both sides. The tubing was connected to a propane gas supply at a pressure of 13 inches water column. The outlet of the tubing was connected to an atmospheric burner with an input of 60,000 BTU/hr.

The burned was positioned, such that when lit, its flame impinged on the wall where the tubing ran. The burner was allowed to continue to burn. When the temperature of the surface of the tubing reached 154° C. the liner expanded and completely stopped the flow of propane to the burner.

In a second test, a fiberglass reinforced expandable liner was disposed within an 8 inch length of ¾ inch CSST. The tubing was plugged at one end and pressurized with propane gas to 13 inches water column. A wire feed welder was used to arc holes in the CSST. The expandable liner inside of the CSST expanded out of the holes, effectively plugging the holes and preventing gas from leaking out of the CSST.

In a third test, a 0.04 inch expandable liner was disposed within and along the length of a 4 foot section of ¾ inch SST. The tubing was connected to a propane gas supply at 13 inches water column. The outlet of the tubing was connected to a 60,000 BTU/hr burner. The burner was lit. A propane torch, using a separate fuel source, was used to apply direct heat on the tubing. The liner expanded, completely stopping the flow of propane to the burner.

A fourth test was conducted to evaluate the performance of a fuse mechanism. In the fourth test, a ⅛ inch and a 1/16 inch fuse cord were wrapped in a spiral fashion around portions of expandable material, such as expandable material used for an expandable core or an expandable liner. These portions of material were placed in 1 inch diameter pipes that were 4 inches long. The fuses were lit and allowed to burn. It was found that the expandable material partially reacted in the areas adjacent to the fuse mechanism. When the portions of expandable material were re-exposed to prolonged heat, the material fully expanded.

The fuse mechanism had a burn rate of 2 second per inch. In other embodiments, a fuse mechanism with a slower burn rate could be used. The expandable material can react and expand when in the presence of heat generated by the fuse mechanism.

The invention claimed is:

1. An assembly for restricting fluid flow in response to elevated temperatures, the assembly comprising:
   a conduit configured for transport of flammable fluid;
   a liner within the conduit;
   the liner comprising a material configured to expand in response to elevation in temperature;
   a non-hollow core positioned within the liner, the core comprising a heat resistant material;
   the liner substantially encircling an opening formed between the liner and the non-hollow core configured to allow the flammable fluid to flow through; and
   wherein upon exposing the conduit to elevated temperature, the liner within the conduit expands around the core sufficient to close the opening to substantially prevent flow of flammable fluid through the conduit.

2. The assembly of claim 1, wherein the liner comprises a thermoplastic material.

3. The assembly of claim 1, wherein the liner comprises polyolefin.

4. The assembly of claim 1, wherein the non-hollow core is substantially continuous along the length of the conduit.

5. The assembly of claim 1, wherein the non-hollow core is provided in segments along the conduit.

6. The assembly of claim 1, wherein the non-hollow core comprises a plurality of beads.

7. The assembly of claim 1, wherein the non-hollow core is integrally formed with the liner.

8. The assembly of claim 1, wherein the non-hollow core comprises expandable foam.

9. The assembly of claim 1, wherein the non-hollow core is formed from an expandable second liner.

10. An assembly for restricting fluid flow in response to elevated temperatures, the assembly comprising:
    a conduit configured for transport of flammable fluid;
    a liner within the conduit;
    the liner comprising a material configured to contract in response to an elevation in temperature;
    the liner disposed on an inner surface of the conduit;
    a non-expandable and non-hollow core positioned within the liner;
    the liner substantially encircling an opening formed between the liner and the non-expandable and non-hollow core configured to allow the flammable fluid to flow through; and
    wherein upon exposing the conduit to elevated temperature, the liner within the conduit surrounds the non-expandable and non-hollow core to close the opening sufficient to substantially prevent flow of flammable fluid through the conduit.

11. The assembly of claim 10, wherein upon exposing the conduit to elevated temperature, the liner within the conduit contracts around the non-expandable and non-hollow core sufficient to substantially prevent flow of flammable gas through the conduit.

12. The assembly of claim 10, wherein the liner comprises a thermoplastic material.

13. The assembly of claim 10, wherein the liner comprises polyolefin.

14. The assembly of claim 10, wherein the non-expandable and non-hollow core is substantially continuous along the length of the conduit.

15. The assembly of claim 10, wherein the non-expandable and non-hollow core is provided in segments along the conduit.

16. The assembly of claim 10, wherein the non-expandable and non-hollow core is integrally formed with the liner.

17. An assembly for restricting gas flow in response to elevated temperatures, the assembly comprising:
    a conduit configured for transport of flammable fluids;
    a liner disposed on an inside wall of the conduit, the liner comprises a material configured to expand in response to an increase in temperature;
    a solid, non-expandable core positioned within the liner;
    an opening formed between the liner and the solid, non-expandable core configured to allow the flammable fluid to flow through;
    wherein upon exposing the conduit to elevated temperature, the liner within the conduit contacts the solid, non-expandable core to close the opening sufficient to substantially prevent flow of flammable fluid through the conduit.

* * * * *